US012652530B2

(12) United States Patent
Narendra et al.

(10) Patent No.: US 12,652,530 B2
(45) Date of Patent: *Jun. 9, 2026

(54) SECURE TRANSACTION USING POINT-OF-USER-INTERACTION APPARATUS AND METHOD THEREOF

(71) Applicant: iCashe, Inc., Portland, OR (US)

(72) Inventors: Siva G. Narendra, Portland, OR (US); Christian M. Trummer, Portland, OR (US)

(73) Assignee: iCashe, Inc., Portland, OR (US)

( * ) Notice: Subject to any disclaimer, the term of this patent is extended or adjusted under 35 U.S.C. 154(b) by 173 days.

This patent is subject to a terminal disclaimer.

(21) Appl. No.: 17/810,203

(22) Filed: Jun. 30, 2022

(65) Prior Publication Data

US 2023/0388794 A1     Nov. 30, 2023

Related U.S. Application Data

(63) Continuation of application No. 17/804,535, filed on May 27, 2022.

(51) Int. Cl.
*H04W 12/06* (2021.01)
*G06Q 20/40* (2012.01)
(Continued)

(52) U.S. Cl.
CPC ........... *H04W 12/06* (2013.01); *H04L 9/3213* (2013.01); *H04L 63/0861* (2013.01); *G06Q 20/401* (2013.01); *G06Q 2230/00* (2013.01)

(58) Field of Classification Search
CPC ............... H04W 12/06; H04L 63/0861; H04L 2209/80; H04L 9/3213; G06Q 20/401;
(Continued)

(56) References Cited

U.S. PATENT DOCUMENTS 6,636,833 B1     10/2003     Flitcroft et al.
7,014,107 B2     3/2006     Singer et al.
(Continued)

FOREIGN PATENT DOCUMENTS

DE     10028813 A1     12/2001
EP     1801741 A3     7/2008
(Continued)

OTHER PUBLICATIONS

International Search Report & Written Opinion notified Aug. 21, 2023 for PCT Patent Application No. PCT/US2023/020504.
(Continued)

*Primary Examiner* — Alexander Lagor
*Assistant Examiner* — Taylor P Vu
(74) *Attorney, Agent, or Firm* — MUGHAL GAUDRY & FRANKLIN PC

(57)     ABSTRACT

A mobile device is described having an antenna to detect a communication target from a point-of-user-interaction apparatus near the mobile device. The mobile device includes a reader that initiates a transmission of a command to the point-of-user-interaction apparatus and reads a response from the point-of-user-interaction apparatus. A display unit changes its display based on the response and/or the communication target. A circuitry executes instructions to receive a first authentication information from the point-of-user-interaction apparatus. The point-of-user-interaction apparatus transmits a second authentication information to a computing device. The circuitry executes instructions to send the first authentication information to the computing device. The computing device authenticates a transaction between the point-of-user-interaction apparatus and the mobile device via the first and second authentication information and notifies the circuitry of a valid transaction between mobile device and the point-of-user-interaction
(Continued)

apparatus after the computing device authenticates the transaction. Unique ID(s) are also exchanged between the mobile device and the point-of-user-interaction apparatus.

23 Claims, 12 Drawing Sheets

(51) Int. Cl.
  *H04L 9/32* (2006.01)
  *H04L 9/40* (2022.01)
(58) Field of Classification Search
  CPC .... G06Q 2230/00; G06Q 20/18; G06Q 20/20; G06Q 20/322; G06Q 20/3278; G06Q 20/3821; G06Q 20/3829; G06Q 20/4014; G06Q 20/40145
  See application file for complete search history.

(56) References Cited

U.S. PATENT DOCUMENTS

| | | | |
|---|---|---|---|
| 8,380,177 | B2 | 2/2013 | Laracey |
| 9,082,056 | B2 | 7/2015 | Day et al. |
| 9,430,767 | B2 * | 8/2016 | Mattsson ............. G06Q 20/382 |
| 9,691,055 | B2 | 6/2017 | von Behren et al. |
| 9,824,408 | B2 | 11/2017 | Isaacson et al. |
| 10,482,457 | B2 | 11/2019 | Poole et al. |
| 11,227,284 | B2 * | 1/2022 | Safak .................... H04L 9/3247 |
| 2008/0103984 | A1 * | 5/2008 | Choe .................... H04L 9/3228 |
| | | | 705/16 |
| 2009/0240626 | A1 | 9/2009 | Hasson et al. |
| 2011/0283111 | A1 | 11/2011 | Bister et al. |
| 2012/0005074 | A1 | 1/2012 | Kothandaraman et al. |
| 2013/0204793 | A1 | 8/2013 | Kerridge et al. |
| 2014/0310182 | A1 | 10/2014 | Cummins |
| 2015/0025988 | A1 | 1/2015 | Fisher |
| 2015/0025989 | A1 * | 1/2015 | Dunstan ................ G07F 17/329 |
| | | | 705/18 |
| 2015/0039403 | A1 | 2/2015 | Grossberg et al. |
| 2015/0143116 | A1 | 5/2015 | Tang et al. |
| 2015/0332271 | A1 | 11/2015 | Collins et al. |
| 2016/0019533 | A1 | 1/2016 | Wu et al. |
| 2016/0086166 | A1 | 3/2016 | Pomeroy et al. |
| 2016/0260085 | A1 * | 9/2016 | Yen .................... G06Q 20/3278 |
| 2016/0307194 | A1 | 10/2016 | Bhatnagar et al. |
| 2017/0123049 | A1 * | 5/2017 | Tsai ...................... H04W 16/14 |
| 2019/0180286 | A1 | 6/2019 | Poole |
| 2019/0199821 | A1 | 6/2019 | Tankha |
| 2019/0272518 | A1 * | 9/2019 | Speiser ................ G06Q 20/384 |
| 2019/0273615 | A1 | 9/2019 | Gordon et al. |
| 2020/0104811 | A1 * | 4/2020 | Schwabline ......... G06Q 20/405 |
| 2020/0162269 | A1 * | 5/2020 | Nix ....................... H04L 9/3066 |
| 2020/0184462 | A1 | 6/2020 | Rule et al. |
| 2020/0286069 | A1 * | 9/2020 | Pearson .............. H04W 12/009 |
| 2020/0296082 | A1 | 9/2020 | Killoran, Jr. et al. |
| 2020/0311712 | A1 * | 10/2020 | Sharma .............. G06Q 20/3278 |
| 2020/0314644 | A1 | 10/2020 | Dean et al. |
| 2020/0394621 | A1 | 12/2020 | Lakshmanan et al. |
| 2021/0174426 | A1 | 6/2021 | Isaacson et al. |
| 2021/0241256 | A1 | 8/2021 | Caldwell |
| 2021/0264434 | A1 * | 8/2021 | Sheets .................... G06Q 20/40 |
| 2021/0312448 | A1 | 10/2021 | Kinagi |
| 2022/0036356 | A1 * | 2/2022 | Praszczalek ............ G06F 21/45 |
| 2022/0058906 | A1 * | 2/2022 | Dundigalla .......... G06Q 20/407 |
| 2022/0076520 | A1 | 3/2022 | Narendra |
| 2022/0122056 | A1 * | 4/2022 | Maes ................. G06Q 20/3224 |
| 2022/0405731 | A1 * | 12/2022 | Wielard ............. G06Q 20/3223 |

FOREIGN PATENT DOCUMENTS

| | | |
|---|---|---|
| FR | 2965082 B1 | 9/2012 |
| JP | 2006157914 A | 6/2006 |
| TW | 202030667 B | 12/2021 |
| WO | 2016129863 A1 | 8/2016 |

OTHER PUBLICATIONS

Office Action and Search Report notified Nov. 10, 2023 for TW Patent Application No. 112116946.
Amazon Pay, downloaded from https://developer.amazon.com/docs/amazon-pay/intro.html on Jun. 2, 2022 (3 pages).
API Collection Apple Pay, downloaded from https://developer.apple.com/documentation/passkit/apple_pay/ on Jun. 2, 2022 (3 pages).
Developer APIs: Payments, Orders, Customers - Square, downloaded from https://developer.squareup.com/us/en on Jun. 2, 2022 (9 pages).
Google Pay API, Google Developers, downloaded from https://developers.google.com/pay/api on Jun. 2, 2022 (14 pages).
Guides Overview—Braintree Developer Documentation, downloaded from https://developer.paypal.com/braintree/docs/ guides/overview on Jun. 2, 2022 (3 pages).
Java Card 3.1 Documentation, downloaded from https://docs.oracle.com/en/java/javacard/3.1/ on Jun. 2, 2022 (2 pages).
Notice of Allowance notified Apr. 6, 2022 for U.S. Appl. No. 17/015,345.
Samsung Pay Developers, downloaded from https://pay.samsung.com/developers on Jun. 2, 2022 (3 pages).
Notice of Allowance notified Mar. 22, 2024 for Taiwan Patent Application No. 112116946.
Non-Final Office Action notified May 7, 2024 for U.S. Appl. No. 17/804,535.
Final Office Action notified Nov. 21, 2024 for U.S. Appl. No. 17/804,535.
International Preliminary Report on Patentability notified Dec. 12, 2024 for PCT Patent Application No. PCT/US2023/020504.
Non-Final Office Action notified Aug. 30, 2024 for U.S. Appl. No. 17/816,870.
Advisory Action notified Apr. 25, 2025 for U.S. Appl. No. 17/816,870.
Final Office Action notified Feb. 13, 2025 for U.S. Appl. No. 17/816,870.

* cited by examiner

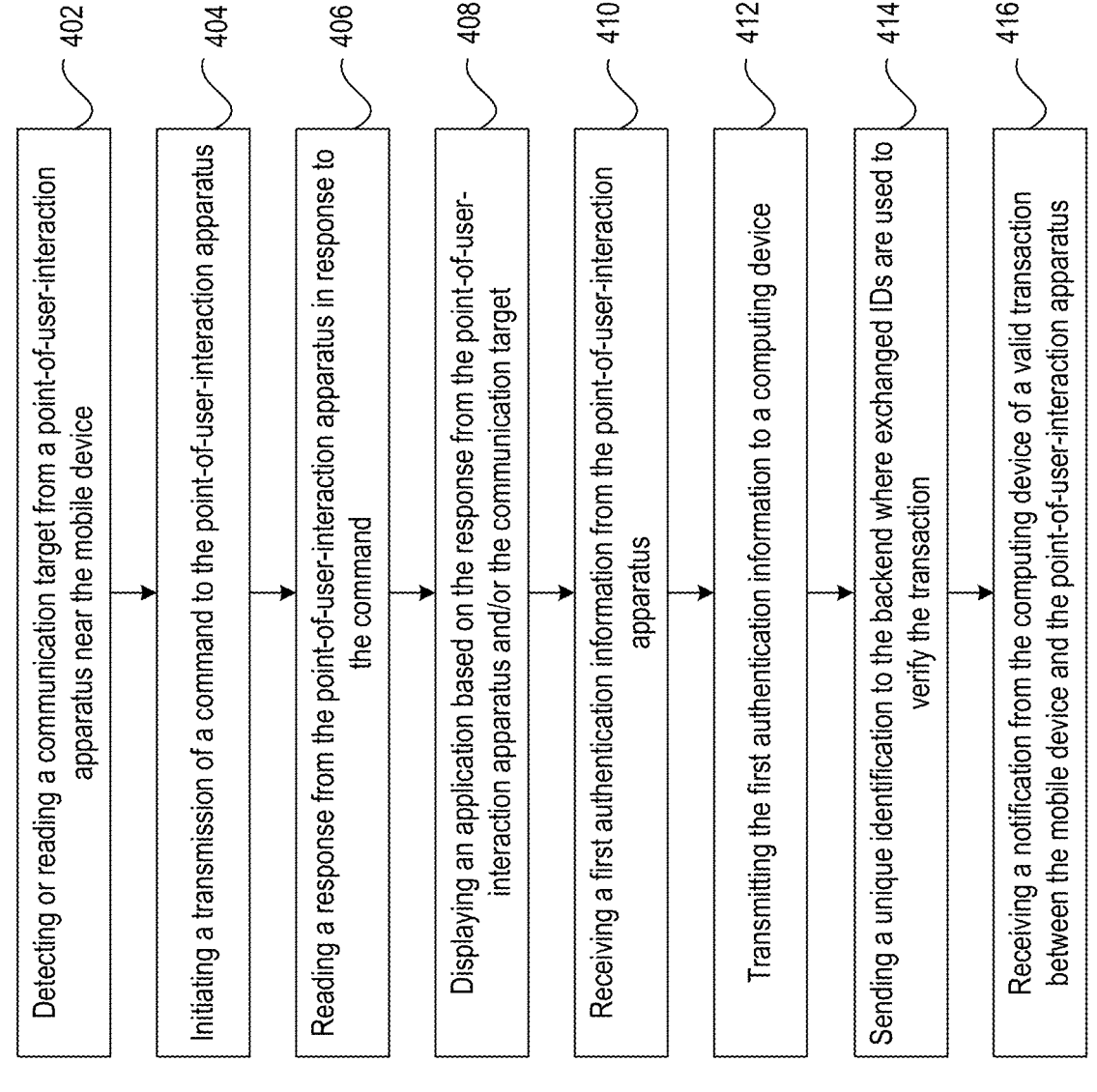

400

Detecting or reading a communication target from a point-of-user-interaction apparatus near the mobile device ⟩ 402

Initiating a transmission of a command to the point-of-user-interaction apparatus ⟩ 404

Reading a response from the point-of-user-interaction apparatus in response to the command ⟩ 406

Displaying an application based on the response from the point-of-user-interaction apparatus and/or the communication target ⟩ 408

Receiving a first authentication information from the point-of-user-interaction apparatus ⟩ 410

Transmitting the first authentication information to a computing device ⟩ 412

Sending a unique identification to the backend where exchanged IDs are used to verify the transaction ⟩ 414

Receiving a notification from the computing device of a valid transaction between the mobile device and the point-of-user-interaction apparatus ⟩ 416

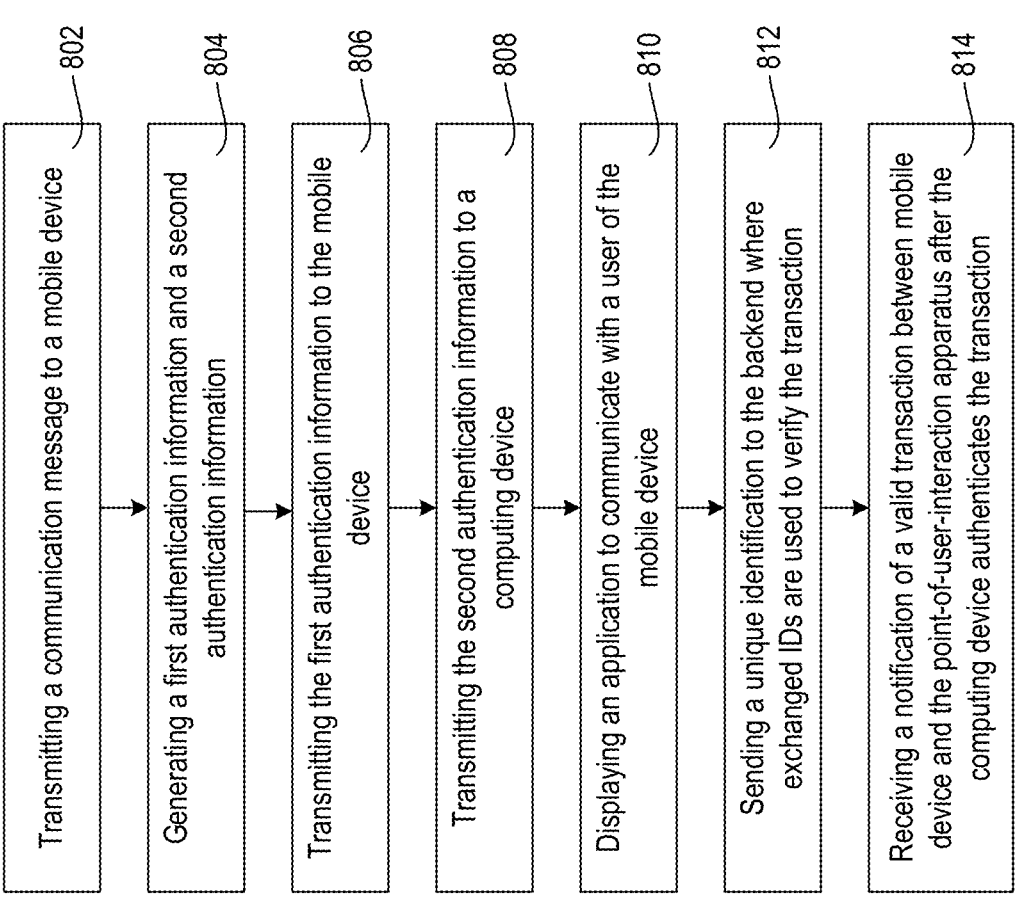

Transmitting a communication message to a mobile device — 802

Generating a first authentication information and a second authentication information — 804

Transmitting the first authentication information to the mobile device — 806

Transmitting the second authentication information to a computing device — 808

Displaying an application to communicate with a user of the mobile device — 810

Sending a unique identification to the backend where exchanged IDs are used to verify the transaction — 812

Receiving a notification of a valid transaction between mobile device and the point-of-user-interaction apparatus after the computing device authenticates the transaction — 814

1000

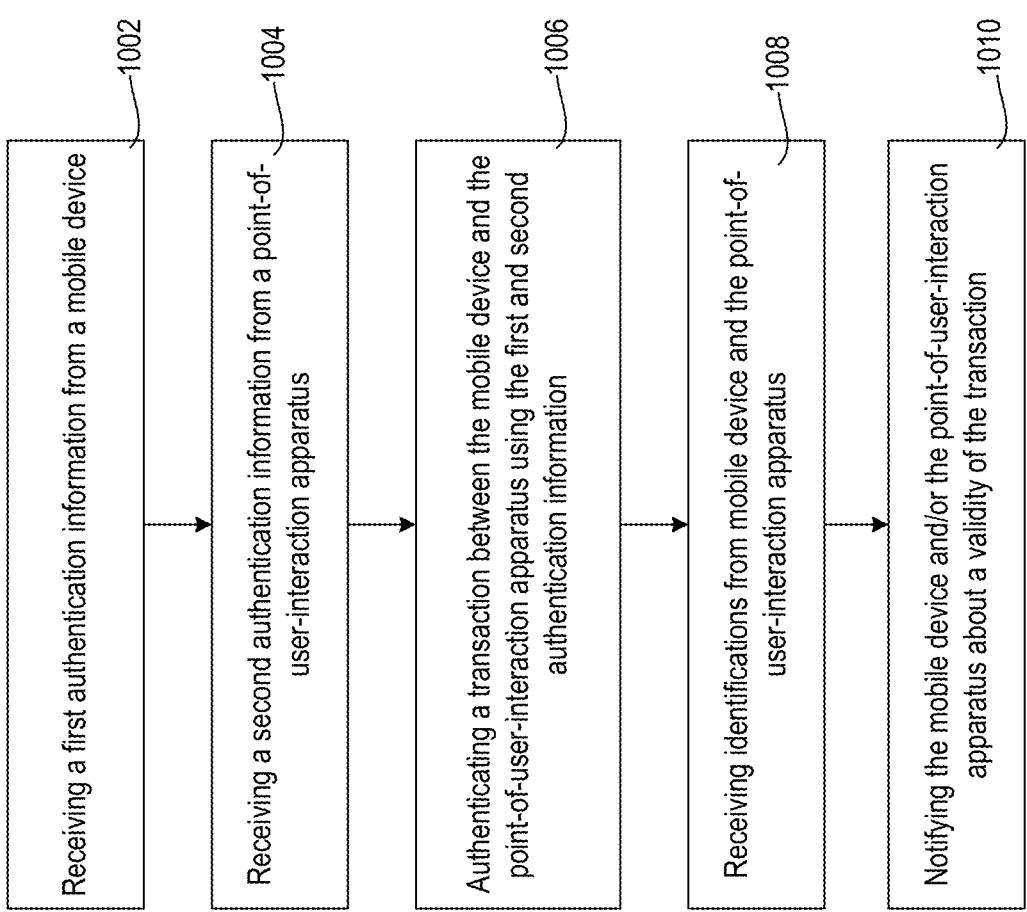

Receiving a first authentication information from a mobile device — 1002

Receiving a second authentication information from a point-of-user-interaction apparatus — 1004

Authenticating a transaction between the mobile device and the point-of-user-interaction apparatus using the first and second authentication information — 1006

Receiving identifications from mobile device and the point-of-user-interaction apparatus — 1008

Notifying the mobile device and/or the point-of-user-interaction apparatus about a validity of the transaction — 1010

Fig. 10

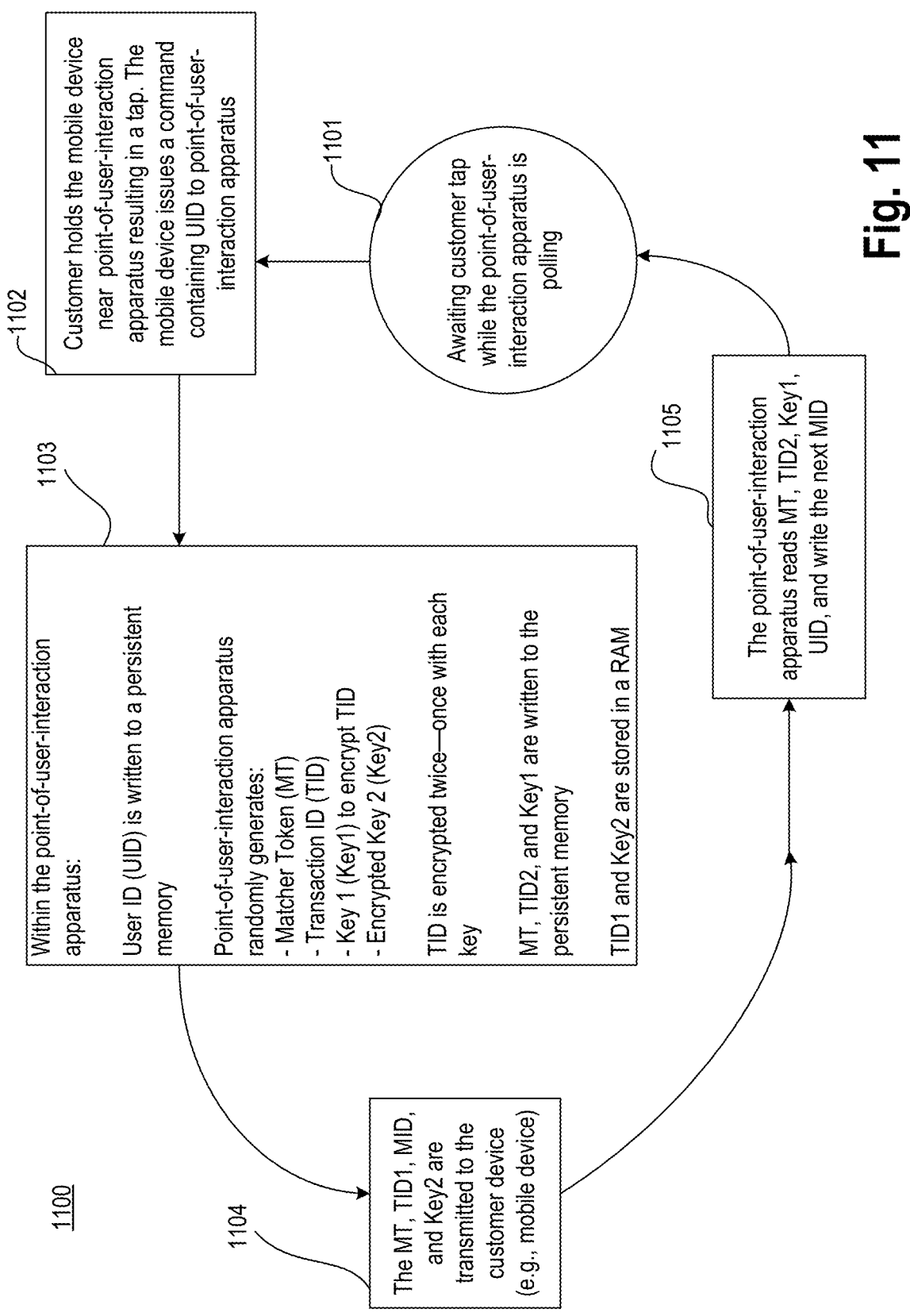

1102
Customer holds the mobile device near point-of-user-interaction apparatus resulting in a tap. The mobile device issues a command containing UID to point-of-user-interaction apparatus 1101
Awaiting customer tap while the point-of-user-interaction apparatus is polling 1103
Within the point-of-user-interaction apparatus:

User ID (UID) is written to a persistent memory

Point-of-user-interaction apparatus randomly generates:
- Matcher Token (MT)
- Transaction ID (TID)
- Key 1 (Key1) to encrypt TID
- Encrypted Key 2 (Key2)

TID is encrypted twice—once with each key

MT, TID2, and Key1 are written to the persistent memory

TID1 and Key2 are stored in a RAM

1104
The MT, TID1, MID, and Key2 are transmitted to the customer device (e.g., mobile device)

1105
The point-of-user-interaction apparatus reads MT, TID2, Key1, UID, and write the next MID

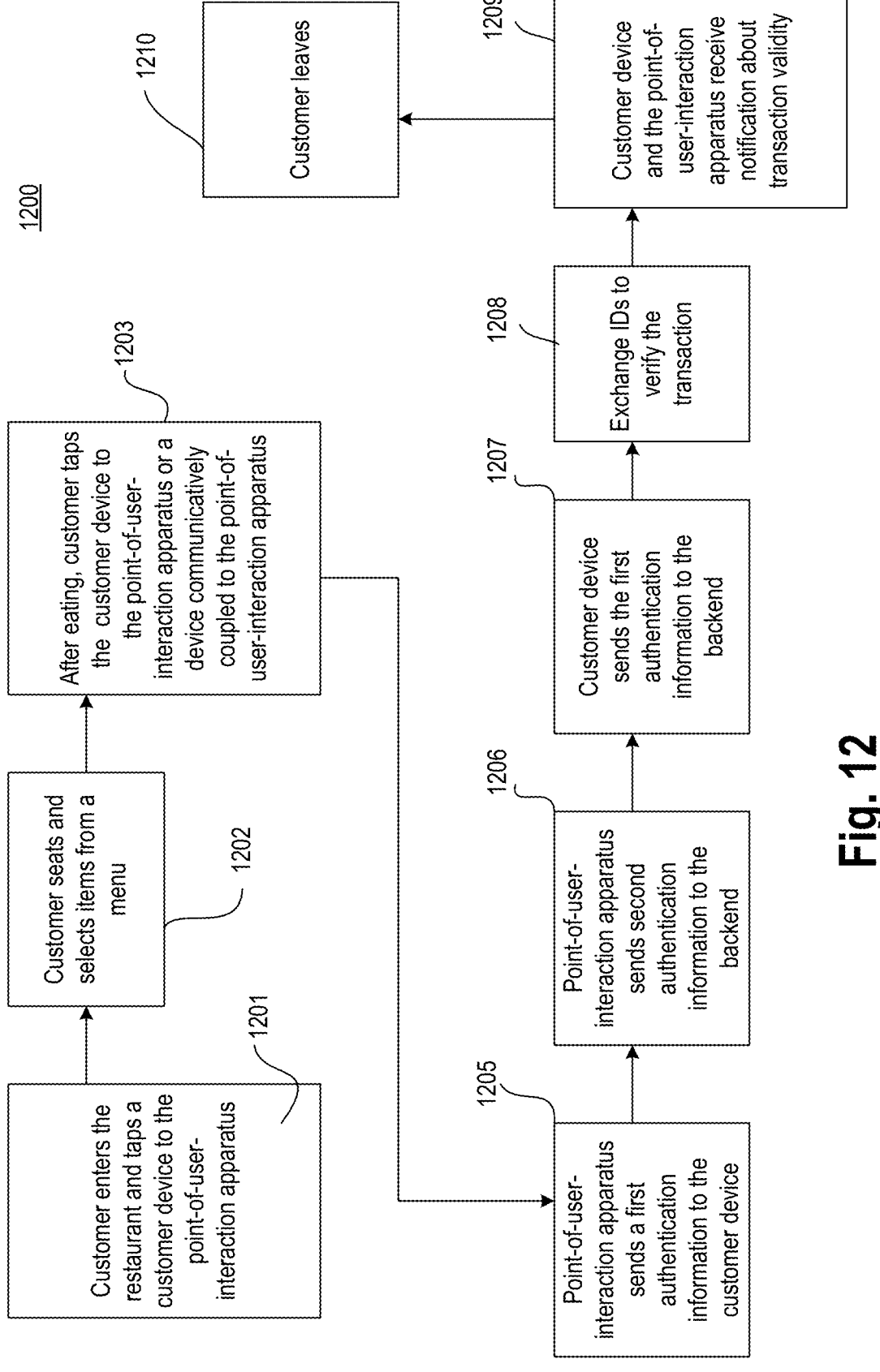

1200

Customer enters the restaurant and taps a customer device to the point-of-user-interaction apparatus
1201

Customer seats and selects items from a menu
1202

After eating, customer taps the customer device to the point-of-user-interaction apparatus or a device communicatively coupled to the point-of-user-interaction apparatus
1203

Point-of-user-interaction apparatus sends a first authentication information to the customer device
1205

Point-of-user-interaction apparatus sends second authentication information to the backend
1206

Customer device sends the first authentication information to the backend
1207

Exchange IDs to verify the transaction
1208

Customer device and the point-of-user-interaction apparatus receive notification about transaction validity
1209

Customer leaves
1210

Fig. 12

SECURE TRANSACTION USING POINT-OF-USER-INTERACTION APPARATUS AND METHOD THEREOF

CLAIM OF PRIORITY

This application is a continuation of, and claims the benefit of priority to U.S. patent application Ser. No. 17/804, 535, filed on May 27, 2022, titled "SECURE MOBILE TRANSACTION APPARATUS AND METHOD" and which is incorporated by reference in its entirety.

BACKGROUND

As mobile communication devices are commonly used in day-to-day activities, security of transactions associated with these mobile communication devices is paramount. Users of mobile devices can now make payments with their mobile devices without physically removing and accessing credit cards. Such mobile payment mechanisms are, however, limited. For example, the mobile payment mechanisms are limited to a particular operating system. In another instance, manufacturers of the mobile device pay feature place restrictions and fees attributed to a particular operating system and/or manufacturer.

The background description provided here is for the purpose of generally presenting the context of the disclosure. Unless otherwise indicated here, the material described in this section is not prior art to the claims in this application and is not admitted to be prior art by inclusion in this section.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 4 illustrates a flowchart of a method performed by a mobile device to authenticate a secure transaction with a point-of-user-interaction apparatus, in accordance with some embodiments.

FIG. 8 illustrates a flowchart of a method performed by the point-of-user-interaction apparatus for secure mobile transaction, in accordance with some embodiments.

FIG. 10 illustrates a flowchart of a method performed by the computing device or the backend server for authenticating the transaction between the mobile device and the point-of-user-interaction apparatus, in accordance with some embodiments.

FIG. 11 illustrates another system-level flowchart for secure mobile transaction, in accordance with some embodiments.

FIG. 12 illustrates a system-level flowchart for secure transaction at a restaurant or a service center, in accordance with some embodiments.

DETAILED DESCRIPTION

Figure 1:
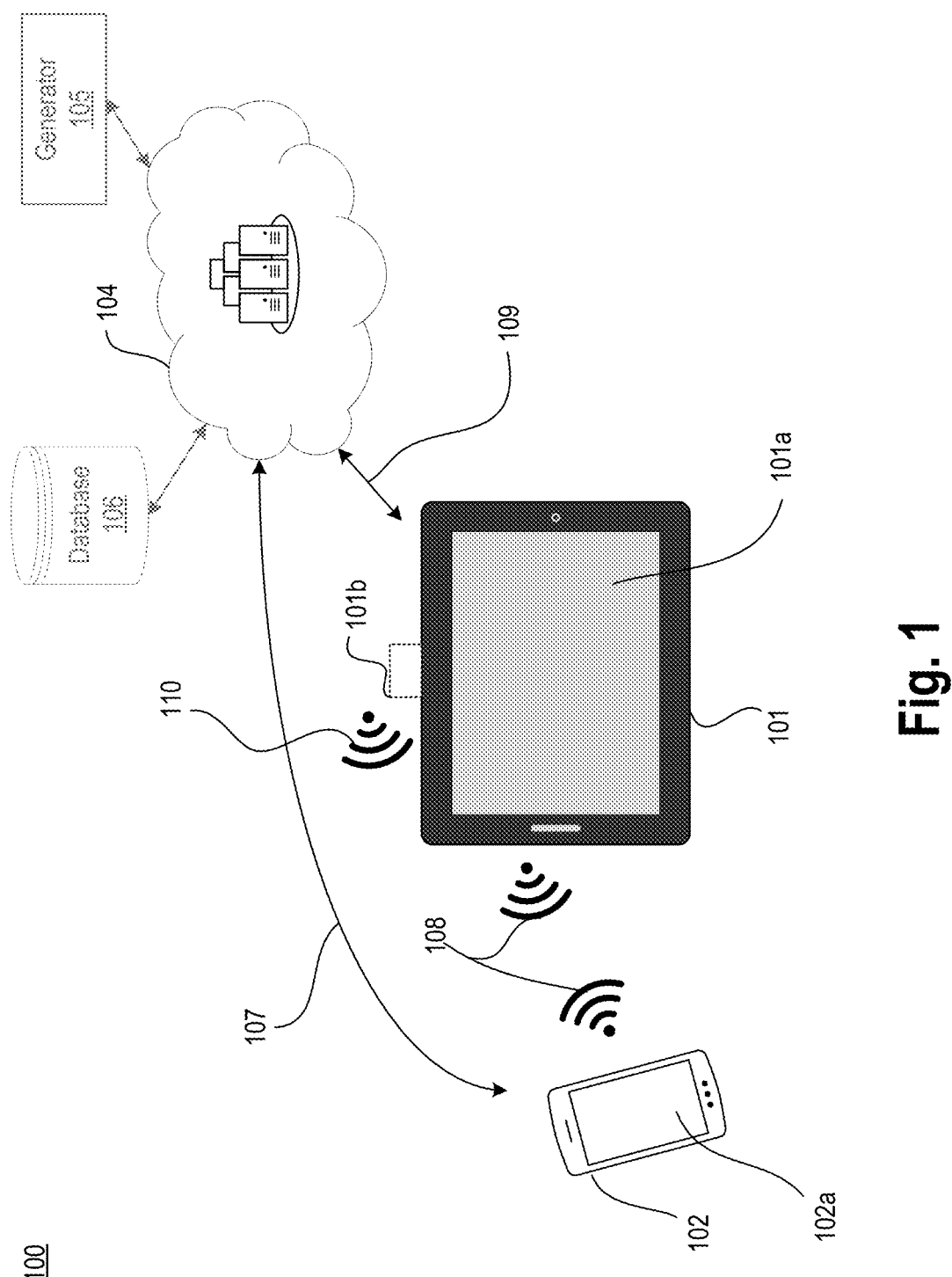
FIG. 1 illustrates a secure mobile transaction system, in accordance with some embodiments.

Some embodiments describe method and apparatus (and/ or system) for secure mobile transaction. In some embodiments, a mobile device or an interacting device is used for making a payment or participating or interacting in a transaction. In some embodiments, the mobile device acts as a reader that can read a communication target from a point-of-user-interaction apparatus. An example of a communication target is a Near-field Communication (NFC) tag such as an ISO 14443 compatible radio link, an ISO 18092 compatible radio link, or an IEEE 802.15.4 compatible radio link.

In some embodiments, the point-of-user-interaction apparatus comprises a merchant terminal that can process credit card payments using a magnetic reader or via a tap of the mobile device on its screen. In some embodiments, the point-of-user-interaction apparatus comprises an active communication target transmitter (e.g., an active NFC) instead of the mobile device. Upon the tap, an authentication process begins where keys and tokens are exchanged with a backend device (e.g., a computing device or server on a cloud). The tokens are decoded by the keys, and the transaction is authenticated for validity based on the decoding. If the transaction is valid, the mobile device and the point-of-user-interaction apparatus are notified of the validity. In various embodiments, the point-of-user-interaction apparatus generates a first identification.

The first identification (e.g., a matcher token) is used to match a first authentication information with a second authentication information. In various embodiments, a matcher token is generated dynamically for each transaction. In some embodiments, a merchant identification (Merchant ID) is a fixed ID for a merchant terminal. In some embodiments, the first authentication information is generated by the point-of-user-interaction apparatus and provided to the mobile device, which in turn provides it to the computing device (e.g., the backend). In some embodiments, the point-of-user-interaction apparatus transmits the second authentication information to the backend device. In some embodiments, the mobile device generates a second identification (e.g., customer ID (also referred to as user ID)) which is a unique identification. In various embodiments, the first identification is provided to the computing device (e.g., the backend device) via the mobile device. The second identification is provided to the backend device via the point-of-user-interaction apparatus. The second identification is used to identify the mobile device to the point-of-user-interaction apparatus.

Continuing with this example, which can be modified to use other forms of IDs, the second identification generated by the mobile device can be provided to the backend via point-of-user-interaction apparatus, and the second identification (herein also referred to as a third identification) generated by the point-of-user-interaction apparatus is provided to the backend via mobile device. As such, the backend device receives the second identifications (also referred to as the second and third identifications) from two different sources and via two different paths. The second identifications (also referred to as the second and third identifications) can be a user ID, merchant ID, or other forms of IDs (such as encrypted IDs). The second and third identifications are usually the same IDs but can be different too. For example, the third identification is an encrypted form of the second identification or vice versa. The encryption can take place on any suitable device. For example, the place where the ID resides and/or originates is where the ID can be encrypted. In another example, a device transmitting the ID may encrypt the ID for subsequent transmission. The second identification, in one example, is used to identify the parties involved in the transaction. This exchange of second identifications in such manner further provides a secure authentication mechanism to authenticate the transaction upon the tap. The exchange of second identifications may occur via any suitable means such as application programmable interfaces (APIs), NFC communication, wireless or wired means. By exchange of the second identifications, the backend can authenticate the transaction, in accordance with various embodiments.

There are many technical effects of the various embodiments. For example, by making the mobile device a reader instead of making the point-of-user-interaction apparatus the reader, and by making the point-of-user-interaction apparatus an active communication target transmitter (e.g., an active NFC) instead of the mobile device, a secure transaction process can be applied to any mobile device regardless of mobile device manufacture limitations on access to the active communication target transmitter. The exchange of information between the point-of-user-interaction apparatus, the mobile device, and the backend device (e.g., the cloud or computing device) verifies the physical presence of a user of the mobile device and its interaction with the point-of-user-interaction apparatus. As such, the validity of the transaction is tied to the physical presence of the user, and this process further reduces fraudulent transactions. Other technical effects will be evident from the various embodiments and drawings.

FIG. 1 illustrates secure mobile transaction system 100, in accordance with some embodiments. In some embodiments, system 100 comprises point-of-user-interaction apparatus 101, mobile device 102, backend or cloud 104 (herein also referred to as a computing device), generator 105, and database 106.

In some embodiments, point-of-user-interaction apparatus 101 comprises a merchant terminal 101a and an add-on 101b. Here, add-on 101b is also referred to as point-of-user-interaction module. In some embodiments, point-of-user-interaction module 101b provides extra capability to existing merchant terminals so they can seamlessly work with mobile device 102 and merchant terminal 101a to establish secure transactions. The form factor of point-of-user-interaction module 101b can be similar to a form factor of a micro-SD card. In some embodiments, point-of-user-interaction module 101b comprises a micro-SD. In some embodiments, point-of-user-interaction module 101b includes two interfaces—a first interface and a second interface. In some embodiments, the first interface comprises an NFC radio with an enhancement circuit. In some embodiments, the enhancement circuit may be a controller or a processor or a secure element with a secure function. In some embodiments, the secure element includes applets, keys, and digital certificates. Digital certificates are used to validate the identity of a certificate holder. Certificate authorities typically issue digital certificates. Digital certificates and their functionality are well known. Secure element applets and encryption keys are also well known. In some embodiments, the secure transaction system makes available one or more applets, keys, and/or digital certificates to create a trusted relationship with mobile device 102 to authenticate or valid the transaction.

In some embodiments, the second interface connects point-of-user-interaction module 101b to merchant terminal 101a. In some embodiments, point-of-user-interaction module 101b can communicate over contact-based interface (e.g., a physical interface such as ISO7816). In some embodiments, point-of-user-interaction module 101b can communicate over contactless-based interface (e.g., ISO14443 based interface). In some embodiments, merchant terminal 101a comprises a controller to communicate with point-of-user-interaction module 101b and also communicates information cryptographically generated and secured in point-of-user-interaction module 101b with backend resources such as backend 104. In some embodiments, merchant terminal 101a includes a dedicated hardware capable of connecting to the internet and hosting point-of-user-interaction module 101b.

In some embodiments, point-of-user-interaction apparatus 101 may be any computer, server, or other electronic device capable of communicating with mobile device 102 via point-of-user-interaction module 101b with or without it, and also capable of communicating with backend 104. Examples of point-of-user-interaction apparatus 101 include, but are not limited to, a voting machine, a point-of-sale terminal, an automated teller machine (ATM), or the like. In some embodiments, point-of-user-interaction apparatus 101 could be a mobile phone or tablet or phablet. In various embodiments, point-of-user-interaction module 101b is fully integrated into merchant terminal 101a.

In some embodiments, mobile device 102 is a customer device. Mobile device 102 may be a smart device such as a tablet, phone, watch, etc. which can communication with point-of-user-interaction apparatus 101 in several ways (e.g., NFC, Bluetooth, etc.). In some embodiments, mobile device 102 communicates with point-of-user-interaction module 101b over ISO14443 contactless interface. In some embodiments, mobile device 102 communicates information cryptographically generated and secured in point-of-user-interaction module 101b with backend resources such as backend 104. In some embodiments, when mobile device 102 comes in close proximity to point-of-user-interaction apparatus 101 and/or point-of-user-interaction module 101b, a tap is registered. A tap may be registered upon a physical contact of mobile device 102 to point-of-user-interaction apparatus 101 and/or point-of-user-interaction module 101b or when mobile device 102 gets in the NFC distance range, for example. In some embodiments, upon a tap, mobile device 102 and point-of-user-interaction apparatus 101 and/or point-of-user-interaction module 101b exchange tokenized identifiers allowing for mutual trust. As discussed herein, in various embodiments, upon a tap, mobile device 102 receives the first authentication information from point-of-user-interaction apparatus 101 and/or point-of-user-interaction module 101b. Mobile device 102 then transmits or sends the first authentication information to backend 104. In various embodiments, upon the tap, point-of-user-interaction apparatus 101 and/or point-of-user-interaction module 101b transmits the second authentication information to backend 104. Now that backend 104 has both the first authentication information and the second authentication information, the transaction between mobile device 102 and point-of-user-interaction apparatus 101 and/or point-of-user-interaction module 101*b* caused by the tap is authenticated.

In some embodiments, this exchange of tokenized identifiers is accomplished by using application programming interfaces (APIs) provided by operating system. Examples of such APIs include Apple® iOS CoreNFC API, iOS Universal Linking or Deep Linking, and iOS Background Tag Reading. In some embodiments, APIs allow for exchange of information between point-of-user-interaction apparatus 101 and/or point-of-user-interaction module 101*b* and mobile device 102. In some embodiments, APIs may allow exchange of information when a user of mobile device 102 holds phone near point-of-user-interaction apparatus 101 and/or point-of-user-interaction module 101*b*. In some embodiments, APIs may allow exchange of information between mobile device 102 and point-of-user-interaction apparatus 101 and/or point-of-user-interaction module 101*b* after a biometric authentication. Examples of biometric authentication include finger touch, face identification, eye identification, etc. In some embodiments, APIs may allow banner notification on the display. In some embodiments, APIs may allow NFC reader (e.g., mobile device 102) to complete custom protocol information exchange.

In some embodiments, backend 104 comprises a server or a computing device which can decide authentication information from mobile device 102 and point-of-user-interaction apparatus 101 to authenticate validity of a transaction. In some embodiments, generator 105 and database 106 are part of backend 104. In some embodiments, generator 105 is an application script application (e.g., Google™ Apps Script) that works in conjunction with document generation application (e.g., Google Sheet document) that automates a back contract or document generation process. In some embodiments, generator 105 communicates with backend resources (e.g., Amazon's AWS resources) to retrieve unprocessed transactions from database 106. Database 106 can be persistent memory, in accordance with various embodiments. In some embodiments, database 106 is an RDS MySQL database from Amazon® Web Services (AWS) and is used to manage transaction data as well as user data. In some embodiments, database 106 is organized into multiple tables. Examples of these multiple tables include tables for transactions, customers, merchants, and bank accounts.

In some embodiments, mobile device 102 can communicate with backend 104 via communication 107. Communication 107 can be a cellular communication or communication via an internet run application on a processor of mobile device 102. In some embodiments, mobile device 102 communicates wirelessly via communication 108 or 110 with point-of-user-interaction apparatus 101. These communications may be near-field or non-near-field communications depending on the messaging type and objective. In some embodiments, point-of-user-interaction apparatus 101 communicates with backend via communication 109. Communication 109 may be a wired communication (e.g., an ethernet cable) or a wireless communication (e.g., non-near-field or cellular). In some embodiments, mobile device 102 comprises an antenna to detect or read a communication target from point-of-user-interaction apparatus 101 near mobile device 102. In some embodiments, the communication target is stored in the point-of-user-interaction module 101*b*. In some embodiments, the antenna may comprise one or more directional or omnidirectional antennas, including monopole antennas, dipole antennas, loop antennas, patch antennas, microstrip antennas, coplanar wave antennas, or other types of antennas suitable for transmission of Radio Frequency (RF) signals. In some multiple-input multiple-output (MIMO) embodiments, the antennas are separated to take advantage of spatial diversity.

In some embodiments, the communication target comprises a near-field communication (NFC) data exchange format (NDEF) target. In some embodiments, the antenna detects or reads the communication target via communication signal 108 and/or 110 (e.g., NFC) from point-of-user-interaction apparatus 101 and/or point-of-user-interaction module 101*b*. In some embodiments, mobile device 102 periodically or continuously listens for one or more communication targets near it. For example, the antenna of mobile device 102 continuously or regularly initiates a transmission and listens for a response from communication targets near mobile device 102. In some embodiments, the transmission and the response are near-field communications. In some embodiments, mobile device 102 comprises a camera or a biometric sensor to authenticate a user of mobile device 102.

In some embodiments, mobile device 102 comprises a reader to initiate a transmission of a command to point-of-user-interaction apparatus 101, and to read a response from point-of-user-interaction apparatus 101, wherein the reader is coupled to the antenna. In some embodiments, the reader (e.g., software and/or hardware) uses near-field or non-near-field communication 108 to transmit the command to point-of-user-interaction apparatus 101. In some embodiments, mobile device 102 includes a display unit 102*a* that changes its display based on the response from point-of-user-interaction apparatus 101 and/or the communication target. In some embodiments, the command may ask whether point-of-user-interaction apparatus 101 is accepting and/or operating on a point-of-sale transaction. Examples of transactions include tallying votes on a validated ballot, or the acceptance of a point-of-sale transaction, registering with an organization, attendance verification, security verification at an office, airport, or any point of entry or exit. In some embodiments, the response may be a communication target or tag sent by point-of-user-interaction apparatus 101 to mobile device 102.

In some embodiments, mobile device 102 comprises a circuitry that executes instructions to receive a first authentication information from point-of-user-interaction apparatus 101. In some embodiments, point-of-user-interaction apparatus 101 transmits a second authentication information to backend 104 (e.g., a computing device). In some embodiments, the circuitry comprises a controller, a microcontroller, or a processor chip. In some embodiments, the circuitry executes instructions to send the first authentication information to backend 104 via communication 107. In some embodiments, backend 104 authenticates a transaction between point-of-user-interaction apparatus 101 and mobile device 102 via the first authentication information and the second authentication information. In some embodiments, backend 104 notifies the circuitry of a valid transaction between mobile device 102 and point-of-user-interaction apparatus 101 after backend 104 authenticates the transaction. As discussed herein, in addition to using first and second authentication information, point-of-user-interaction apparatus 101 and mobile device 102 also exchange IDs to authenticate the transaction. These IDs include matcher token and customer ID, and/or merchant ID, in some examples. In some embodiments, the valid transaction is a financial transaction. For example, the financial transaction is a point-of-sale credit or debit card based transaction. In some embodiments, the valid transaction is casting a voting ballot.

In some embodiments, the first authentication information includes a first key, associated with a first cryptographic token, from point-of-user-interaction apparatus 101. In some embodiments, the first authentication information further includes a second cryptographic token, associated with a second key, from the point-of-user-interaction apparatus. In some embodiments, the second authentication information includes the second key and the first cryptographic token.

In various embodiments, point-of-user-interaction apparatus 101 generates a first identification. The first identification (e.g., a matcher token) is used to match the first authentication information with the second authentication information, in some examples. In various embodiments, a matcher token is generated dynamically for each transaction. Conversely, a merchant identification (Merchant ID) is a fixed ID for a merchant terminal. In some embodiments, the first authentication information is generated by the point-of-user-interaction apparatus and provided to the mobile device, which in turn provides it to the computing device 104 (e.g., backend 104). In some embodiments, point-of-user-interaction apparatus 101 transmits the second authentication information to backend device 104. In some embodiments, mobile device 102 generates a second identification (e.g., customer ID (also referred to as user ID), which is a unique identification. In various embodiments, the first identification is provided to computing device 104 (e.g., backend 104) via mobile device 102. The second identification is provided to backend device 102 via point-of-user-interaction apparatus 101, in accordance with some embodiments. The second identification is used to identify mobile device 102 to point-of-user-interaction apparatus 101. In some embodiments, point-of-user-interaction apparatus 101 generates a second identification (e.g., merchant ID), which is a unique identification. In various embodiments, the first identification is provided to computing device 104 (e.g., backend 104) via point-of-user interaction apparatus 101. The second identification is provided to backend device 104 via mobile device 102. The second identification is used to identify the mobile device to the point-of-user-interaction apparatus.

In some embodiments, the reader comprises a first application programmable interface (API) to initiate the transmission and to read the response. In some embodiments, mobile device 102 comprises a second application programmable interface to issue a notification or a hyperlink based on the response, wherein a user interaction with the notification or the hyperlink is to cause the display of the application. This allows an application to open directly without user interaction or with minimal user interaction. In some embodiments, the application may be already downloaded from an application store (AppStore) on mobile device 102. In some embodiments, the notification or the hyperlink is transmitted from the communication target. In some embodiments, mobile device 102 comprises a camera or a biometric sensor to authenticate a user of mobile device 102 based on a user's interaction with the notification or the hyperlink.

In some embodiments, backend 104 is a first computing device, and wherein point-of-user-interaction apparatus 101 transmits the first cryptographic token and the second key to a second computing device. In some embodiments, the second computing device transmits the first cryptographic token and the second key to the first computing device. In various embodiments, backend 104 decodes the second cryptographic token with the second key. In some embodiments, backend 104 notifies the circuitry of a validity of the transaction between mobile device 102 and point-of-user-interaction apparatus 101 after the first cryptographic token and the second cryptographic token are decoded.

Figure 2:
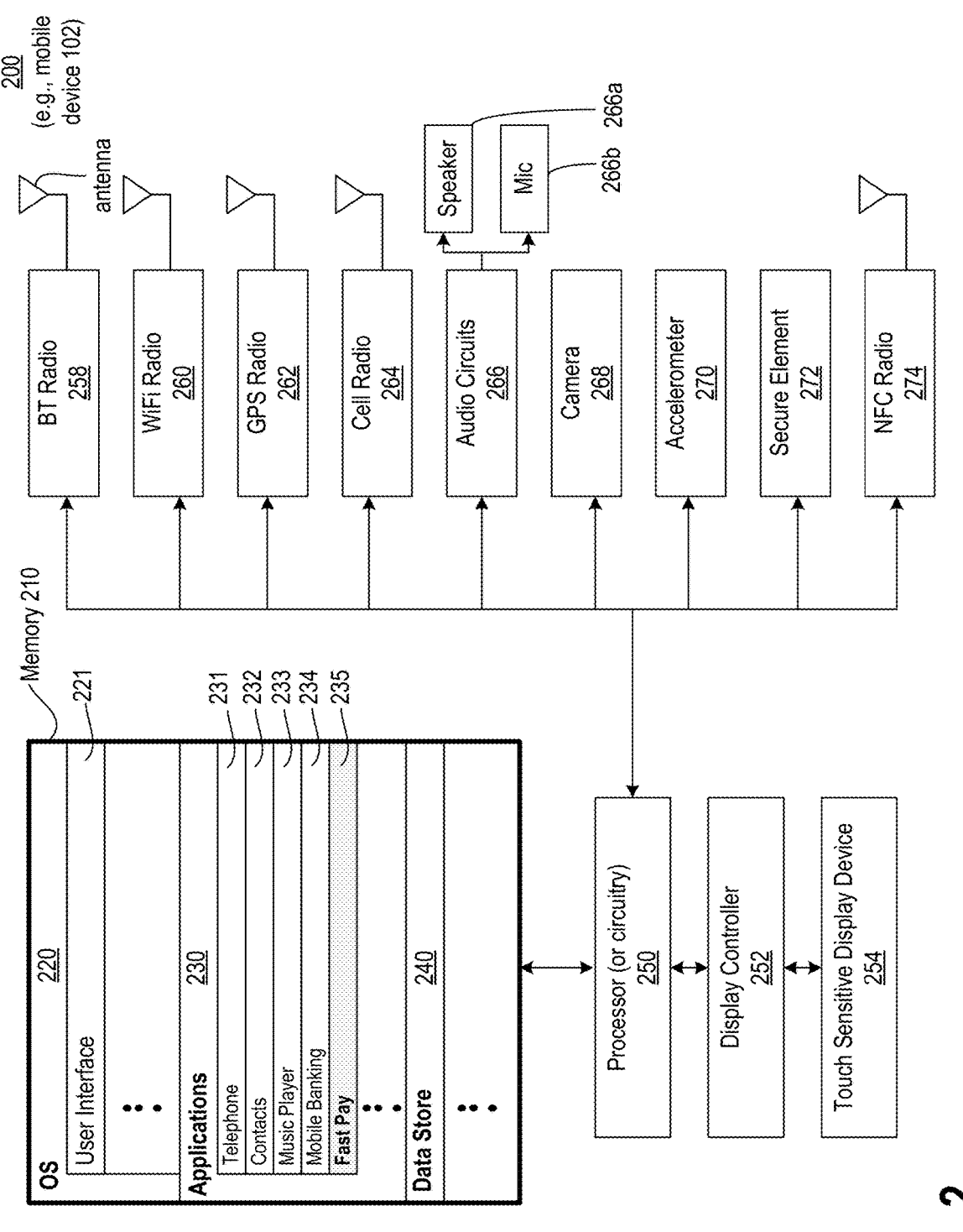
FIG. 2 illustrates a mobile device with software and hardware for secure mobile transaction, in accordance with some embodiments.

FIG. 2 illustrates mobile device 200 with software and hardware for secure mobile transaction, in accordance with some embodiments. In some embodiments, mobile device 200 includes processor 250, memory 210, display controller 252, touch sensitive display device 254, Bluetooth radio 258, WiFi radio 260, GPS radio 262, cellular radio 264, audio circuits 266 (e.g., speaker 266a and Mic 266b), camera 268, accelerometer 270, secure element 272, and near-field communications (NFC) radio 274. In some embodiments, mobile device 200 may be any type of device that includes all or some of the components shown. For example, in some embodiments, mobile device 200 may be a cell phone, a smartphone, a tablet computer, a laptop computer, or the like.

In some embodiments, processor 250 may be any type of processor capable of executing instructions stored in memory 210 and capable of interfacing with the various components shown in FIG. 2. For example, processor 250 may be a microprocessor, a digital signal processor, an application specific processor, or the like. In some embodiments, processor 250 is a component within a larger integrated circuit such as a system on chip (SOC) application specific integrated circuit (ASIC).

Display controller 252 provides an interface between processor 250 and touch sensitive display device 254. In some embodiments, display controller 252 is integrated within processor 250, and in other embodiments, display controller 252 is integrated within touch sensitive display device 254.

Touch sensitive display device 254 is a display device that includes a touch sensitive surface, sensor, or set of sensors that accept input from a user. For example, touch sensitive display device 254 may detect when and where an object touches the screen, and may also detect movement of an object across the screen. When touch sensitive display device 254 detects input, display controller 252 and processor 250 (in association with user interface component 221) determine the appropriate response. For example, in response to user input, applications may be started, icons may be moved, or fast pay application may be started for secure payment transaction.

Touch sensitive display device 254 may be manufactured using any applicable display technologies, including for example, liquid crystal display (LCD), active matrix organic light emitting diode (AMOLED), and the like. Further, touch sensitive display device 254 may be manufactured using any application touch sensitive input technologies, including for example, capacitive and resistive touch screen technologies, as well as other proximity sensor technologies.

Bluetooth radio 258 is a type of non-near-field radio capable of communicating on a frequency between 2.402 GHz and 2.480 GHz. Bluetooth is an example of a non-near-field protocol because the wavelength is on the order of 4.5 inches and the intended communication distance is typically much greater than 4.5 inches. The use of the term "non-near-field radio" is not meant to imply that the distance of communication cannot be less than the wavelength for the non-near-field radio. Bluetooth radio 258 can communicate on a personal-area network (PAN) with other Bluetooth devices on the personal-area network. In some embodiments Bluetooth radio 258 is omitted.

WiFi radio 260 may be any type of radio capable of communicating over a wireless network. Examples include radios that are compatible with one or more of the Institute of Electrical and Electronics Engineers (IEEE) 802.11 standards. In some embodiments, WiFi radio 260 is omitted. In some embodiments, mobile device 200 uses WiFi radio 260 to communicate with backend 104.

GPS radio 262 includes a global positioning system (GPS) receiver capable of determining the present location (e.g., latitude and longitude) of mobile device 200. In some embodiments, GPS radio 262 is used to provide location information to communicate with backend 104. Cellular radio 264 may be any type of radio that can communicate within a cellular network. Examples include, but are not limited to, radios that communicate using orthogonal frequency division multiplexing (OFDM), code division multiple access (CDMA), time division multiple access (TDMA), and the like. Cellular radio 264 may operate at any frequency or combination of frequencies without departing from the scope of the present invention. In some embodiments, cellular radio 264 is omitted. In some embodiments, mobile device 200 uses cellular radio 264 to communicate with backend 104.

Audio circuits 266 provides an interface between processor 250 and audio devices such as a speaker and microphone.

Camera 268 may be any camera suitable for use in a mobile device. For example, camera 268 may include a CMOS sensor with optics or any other type of image capture device at any resolution. Camera 268 may be operated by a camera software application (not shown). Accelerometer 270 detects motion of mobile device 200, and may be used by any software application.

In some embodiments, secure element 272 provides secure information storage. In some embodiments, secure element 272 is a smartcard compatible secure element commonly found in credit card applications and/or security applications. NFC radio 274 provides near-field communications capability between mobile device 200 and other devices nearby. In some embodiments, NFC radio 274 may operate at 13.56 megahertz, although this is not a limitation of the present invention. In some embodiments, mobile device 200 uses NFC radio 274 to communicate with point-of-user interface apparatus 101.

In some embodiments, secure element 272 is combined with NFC radio 274 in a single integrated circuit such as a smartcard controller. In other embodiments, secure element 272, or a combination of secure element 272 and NFC radio 274 are integrated into another semiconductor device such as processor 250.

Examples of smart card controllers that combine secure element 272 with NFC radio 274 are the "SmartMX" controllers sold by NXP Semiconductors N.V. of Eindhoven, The Netherlands. In some embodiments, the secure element has an ISO/IEC 7816 compatible interface that communicates with other components within mobile device 200 (e.g., processor 250), although this is not a limitation of the present invention. Further, in some embodiments, NFC radio 274 has an ISO/IEC 14443 contactless interface.

Mobile device 200 may include many other circuits and services that are not specifically shown in FIG. 2. For example, in some embodiments, mobile device 200 may include an additional camera, haptic feedback devices, and the like. Any number and/or type of circuits and services may be included within mobile device 200 without departing from the scope of the various embodiments.

Memory 210 may include any type of memory device. For example, memory 210 may include volatile memory such as static random-access memory (SRAM), or nonvolatile memory such as FLASH memory. Memory 210 is encoded with (or has stored therein) one or more software modules (or sets of instructions), that when accessed by processor 250, result in processor 250 performing various functions. In some embodiments, the software modules stored in memory 210 may include an operating system (OS) 220 and applications 230. Applications 230 may include any number or type of applications. Examples provided in FIG. 2 include a telephone application 231, a contacts application 232, a music player application 233, mobile banking 234, and a fast pay or secure transaction application 235. Memory 210 may also include any amount of space dedicated to data storage 240.

Operating system 220 may be a mobile device operating system such as an operating system to control a mobile phone, smartphone, tablet computer, laptop computer, or the like. As shown in FIG. 2, operating system 220 includes user interface component 221. Operating system 220 may include many other components without departing from the scope of the present invention.

User interface component 221 includes processor instructions that cause mobile device 200 to display content on touch sensitive display device 254, recognize user input, and to provide the user input to applications. User interface component 221 also includes instructions to display menus, move icons, and manage other portions of the display environment.

Telephone application 231 may be an application that controls a cell phone radio. Contacts application 232 includes software that organizes contact information. Contacts application 232 may communicate with telephone application 231 to facilitate phone calls to contacts. Music player application 233 may be a software application that plays music files that are stored in data storage 240.

Fast pay or secure transaction application 235 may be a software application that communicates with a banking service to allow banking functions such as balance inquiries, funds transfers, bill payment, and the like. Fast pay or secure transaction application 235 may be a downloaded "thick" application, or may be a "thin" application that uses internet browser functionality. Other application examples include applications that store an identity such as a passport or a building access identity.

In some embodiments, mobile banking application 235 includes processor instructions that allow mobile device 200 to perform mobile payments. For example, fast pay or secure transaction application 235 may include processor instructions that handle access to one or more payment instruments such as credit cards, debit cards, and pre-paid cards. In some embodiments, fast pay or secure transaction application 235 communicates with smartcard secure element 272 and/or NFC radio 274 within mobile device 200. For example, fast pay or secure transaction 235 may store and access payment identities in smartcard secure element 272 and allow proximity payments using NFC radio 274.

Each of the above-identified applications corresponds to a set of instructions for performing one or more functions described above. These applications (sets of instructions) need not be implemented as separate software programs, procedures or modules, and thus various subsets of these applications may be combined or otherwise re-arranged in various embodiments. For example, telephone application 231 may be combined with contacts application 232. Furthermore, memory 210 may store additional applications (e.g., video players, camera applications, etc.,) and data structures not described above.

It should be noted that mobile device 200 is presented as an example of a user device, and that mobile device 200 may have more or fewer components than shown, may combine two or more components, or may have a different configuration or arrangement of components. For example, mobile device 200 may include many more components such as sensors (optical, touch, proximity etc.), or any other components suitable for use in a mobile device.

Figure 3:
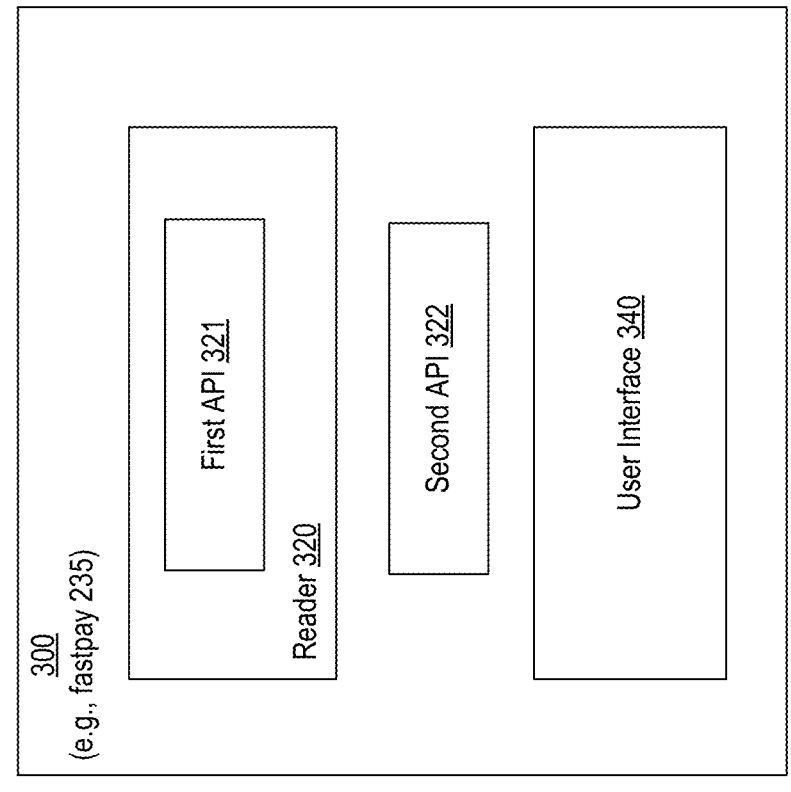
FIG. 3 illustrates a software module executable on a mobile device for secure mobile transaction, in accordance with some embodiments.

FIG. 3 illustrates software module 300 executable on mobile device 102 for secure mobile transaction, in accordance with some embodiments. Software module 300 is part of the overall secure transaction software executable on mobile device 102. In various embodiments, software module 300 comprises reader 320 to initiate a transmission of a command to point-of-user-interaction apparatus 101, and to read a response from point-of-user-interaction apparatus 101. In some embodiments, reader 320 includes a first API 321 to initiate the transmission and to read the response. In some embodiments, first API 321 is used for background tag reading. In some embodiments, software module 300 includes a second API 322 to issue a notification or a hyperlink based on the response. In some embodiments, second API 322 is used for information exchange. In some embodiments, a user interaction with the notification or the hyperlink causes the display of the application. In some embodiments, the notification or the hyperlink is transmitted from the communication target (e.g., NFC tag). In some embodiments, software module 300 includes a user interface 340 to access or communicate with software module 300. In some embodiments, camera 268 or any other biometric sensor is used to authenticate a user of mobile device 102 based on a user's interaction with the notification or the hyperlink.

FIG. 4 illustrates flowchart 400 of a method performed by mobile device 102 to authenticate a secure transaction with point-of-user-interaction apparatus 101, in accordance with some embodiments. While the blocks in flowchart 400 are shown in a particular order, the order can be modified. For example, some blocks may be performed in parallel while some blocks may be performed before others. The blocks here can be implemented in software, hardware, or a combination of both.

At block 402, mobile device 102 detects or reads a communication target from point-of-user-interaction apparatus 101 near mobile device 102. At block 404, mobile device 102 initiates a transmission of a command to point-of-user-interaction apparatus 101. At block 406, mobile device 102 reads a response from point-of-user-interaction apparatus 101 in response to the command. In one example, the transmission and the response are near-field communications. In some embodiments, the method of reading the response comprises operating a first application programmable interface to initiate the transmission and to read the response.

At block 408, mobile device 102 displays an application based on the response from point-of-user-interaction apparatus 101 and/or the communication target (e.g., NFC data exchange format (NDEF) target). At block 410, mobile device 102 receives a first authentication information from the point-of-user-interaction apparatus. At block 412, mobile device 102 transmits the first authentication information to backend 104. In some embodiments, backend 104 receives a second authentication information directly or indirectly from point-of-user-interaction apparatus 101. In some embodiments, wherein backend 104 authenticates a transaction between point-of-user-interaction apparatus 101 and mobile device 102 via the first authentication information and the second authentication information.

As discussed herein, the first authentication information includes a first key, associated with a first cryptographic token, from point-of-user-interaction apparatus 101. The first authentication information further includes a second cryptographic token, associated with a second key, from the point-of-user-interaction apparatus. In some embodiments, the second authentication information includes the second key and the first cryptographic token. In some embodiments, the key (e.g., the first key and/or the second key) is a symmetric key. In some embodiments, the key (e.g., the first key and/or the second key) is an asymmetric key. In some embodiments, the method of detecting or reading the communication target comprises continuously or regularly listening for communication targets near the mobile device.

In some embodiments, the method comprises operating a second application programmable interface to issue a notification or a hyperlink based on the response. As discussed herein, a user interaction of notification or the hyperlink causes the display of the application. The notification or the hyperlink is embedded in the communication target. In some examples, the valid transaction is a financial transaction, or a voting ballot. In some embodiments, the method comprises transmitting the first key and the second cryptographic token to backend 104. In some embodiments, backend 104 decodes the second cryptographic token with the second key.

At block 414, mobile device 102 sends a unique identification (e.g., customer ID) to backend 104. As discussed herein, an exchange of IDs takes place originating from mobile device 102 and point-of-user-interaction apparatus 101 to verify the transaction and the tap. In some embodiments, point-of-user-interaction apparatus 101 generates a first identification. The first identification (e.g., a matcher token) is used to match the first authentication information with the second authentication information, in some examples. In various embodiments, a matcher token is generated dynamically for each transaction. Conversely, a merchant identification (Merchant ID) is a fixed ID for a merchant terminal. In some embodiments, the first authentication information is generated by the point-of-user-interaction apparatus and provided to the mobile device, which in turn provides it to the computing device 104 (e.g., backend 104). In some embodiments, point-of-user-interaction apparatus 101 transmits the second authentication information to backend device 104.

In various embodiments, there is an exchange of identifications between mobile device 102 and point-of-user-interaction apparatus 101 to further secure the transaction between mobile device 102 and point-of-user-interaction apparatus 101 caused by a tap. For example, mobile device 102 generates a second identification (e.g., customer ID (also referred to as user ID)) which is a unique identification. In various embodiments, the first identification is provided to computing device 104 (e.g., backend 104) via mobile device 102. The second identification is provided to backend device 102 via point-of-user-interaction apparatus 101, in accordance with some embodiments. The second identification is used to identify mobile device 102 to point-of-user-interaction apparatus 101. In some embodiments, point-of-user-interaction apparatus 101 generates a second identification (e.g., merchant ID) which is a unique identification. In various embodiments, the first identification is provided to computing device 104 (e.g., backend 104) via point-of-user interaction apparatus 101. The second identification is provided to backend device 104 via mobile device 102. The second identification is used to identify the mobile device to the point-of-user-interaction apparatus.

Continuing with this example, which can be modified to use other forms of IDs, the second identification generated by mobile device 102 can be provided to backend 104 via point-of-user-interaction apparatus 101. The second identification (herein also referred to as a third identification) is generated by point-of-user-interaction apparatus 101 is provided to backend 104 via mobile device 102. As such, backend device 104 receives the second identifications (also referred to as the second and third identifications) from two different sources and via two different paths. The second identifications (also referred to as the second and third identifications) can be a user ID, merchant ID, or other forms of IDs (such as encrypted IDs). The second and third identifications are usually the same IDs but can be different too. For example, the third identification is an encrypted form of the second identification or vice versa. The encryption can take place on any suitable device. For example, the place where the ID resides and/or originates is where the ID can be encrypted. In another example, a device transmitting the ID may encrypt the ID for subsequent transmission. The second identifications, in one example, is used to identify the parties involved in the transaction. This exchange of second identifications in such manner further provides a secure authentication mechanism to authenticate the transaction upon the tap. The exchange of second identifications may occur via any suitable means such as application programmable interfaces (APIs), NFC communication, wireless or wired means. By exchange of the second identifications, backend 104 can authenticate the transaction and/or the tap, in accordance with various embodiments.

In some embodiments, the method comprises receiving a notification of a valid transaction between mobile device 102 and point-of-user-interaction apparatus 101 after the first cryptographic token and the second cryptographic token are decoded. In some embodiments, point-of-user-interaction apparatus 101 generates a first identification, wherein the first identification is used to match the first authentication information with the second authentication information. An example of the first identification is a matcher identification (matcher token). In one example, a matcher token or a matcher ID can be a 16-byte unique identifier used to match a first authentication information with a second authentication information so that a first key can be used to decode a first cryptographic token and a second key can be used to decode a second cryptographic token.

At block 416, mobile device 102 receives a notification, from backend 104, of a valid transaction between mobile device 102 and point-of-user-interaction apparatus 101 after backend 104 authenticates the transaction.

Figure 5:
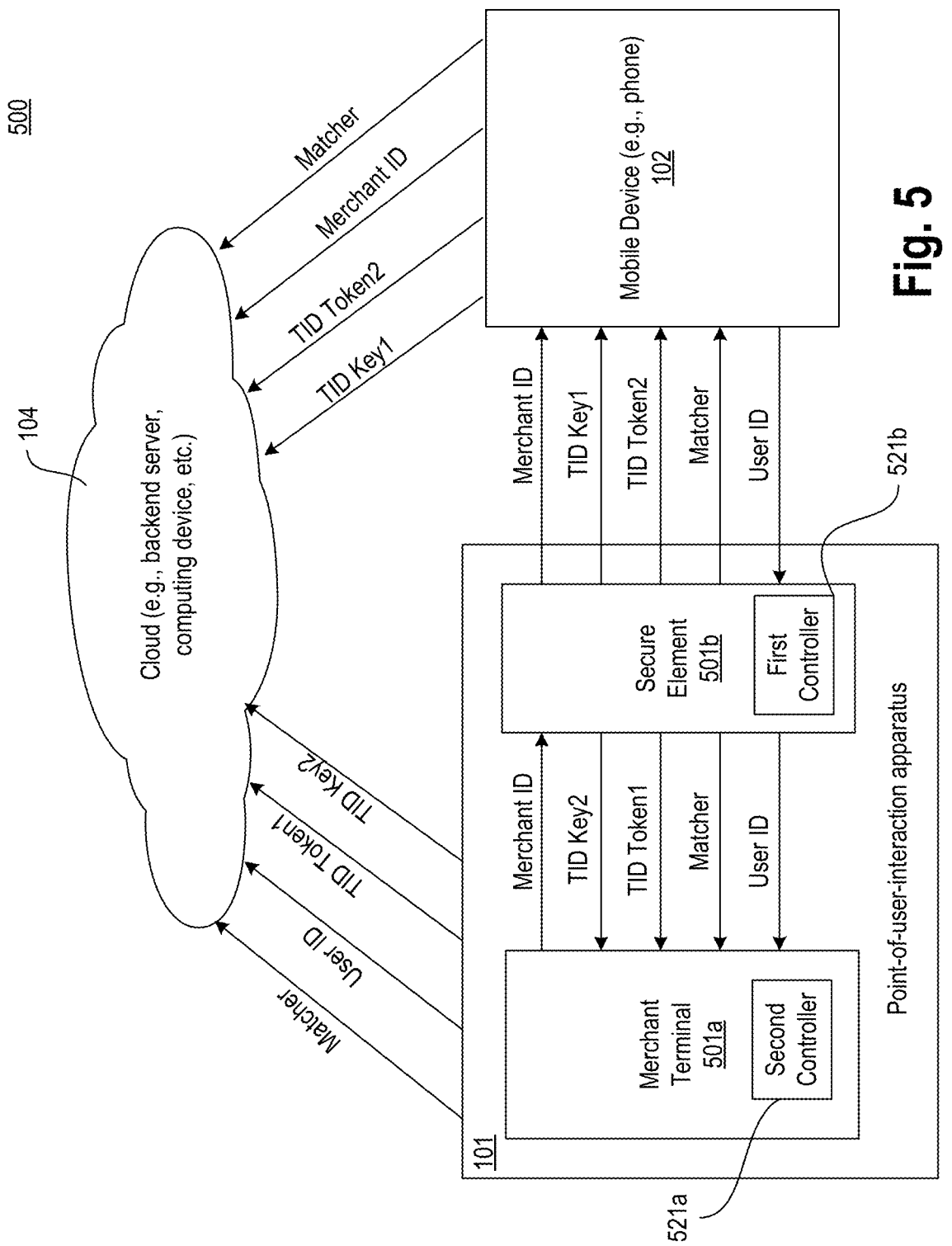
FIG. 5 illustrates a system showing system level communication between the mobile device, the point-of-user-interaction apparatus, and a computing device for secure mobile transaction, in accordance with some embodiments.

FIG. 5 illustrates system 500 showing system level communication between mobile device 102, point-of-user-interaction apparatus 101, and a computing device (herein backend 104) for secure mobile transaction, in accordance with some embodiments. As discussed herein, mobile device 102 executes instructions to receive a first authentication information from point-of-user-interaction apparatus 101, while point-of-user-interaction apparatus 101 transmits a second authentication information to backend 104. Mobile device 102 then executes instructions to send the first authentication information to backend 104. This is done for backend 104 to authenticate a transaction between point-of-user-interaction apparatus 101 and mobile device 102. In addition to the authentication information, additional identification may also be communicated between mobile device 102, point-of-user-interaction apparatus 101, and backend 104.

In some embodiments, mobile device 102 provides its unique identification (User ID) to point-of-user-interaction apparatus 101. In some embodiments, point-of-user-interaction apparatus 101 may include two separate modules that are communicatively coupled. These modules include add-on 101b (also referred to as point-of-user-interaction module 101a) and main merchant terminal 101a (also referred to as merchant terminal 501a). In various embodiments, point-of-user-interaction module 101a performs a security function and includes a controller or microcontroller (or processor). Here, point-of-user-interaction module 101a is referred to as a secure element 501b. In some embodiments, secure element 501b includes a first controller 521b. In some embodiments, merchant terminal 501a includes a second controller 521a.

In some embodiments, secure element 501a includes applets, keys and digital certificates. Digital certificates are used to validate the identity of a certificate holder. Certificate authorities typically issue digital certificates. In some embodiments, the secure transaction system makes available one or more applets, keys, and/or digital certificates to create a trusted relationship with mobile device 102 to authenticate or valid the transaction.

In some embodiments, secure element 501b generates the first authentication information which includes TID Token2 and TID Key1. In various embodiments, secure element 501b provides the first authentication information to mobile device 102. In addition to the first authentication information, secure element 501b also provides Merchant ID and Matcher (herein also referred to as Matcher token or Matcher ID) to mobile device 102. In some embodiments, Merchant ID is an identification of merchant terminal 501a. Secure element receives the Merchant ID from merchant terminal 501a and provides it to mobile device 102. In some embodiments, secure element 501b generates the second authentication information. The second authentication information includes TID Token1 and TID Key2. In various embodiments, point-of-user-interaction apparatus 101 sends the second authentication information to backend 104. In addition to the second authentication information, point-of-user-interaction apparatus 101 also sends the Matcher and User ID to backend 104. The keys and corresponding tokens are split and sent to backend 104 via different devices (e.g., point-of-user-interaction apparatus 101 and mobile device 102) so that one device sends a key and another device sends the corresponding token to backend 104. For example, Key1 of Token1 is sent to backend 104 via mobile device 102, while Token1 is sent to backend 104 via point-of-user-interaction apparatus 101. Likewise, Key2 of Token2 is sent to backend 104 via point-of-user-interaction apparatus 101, while Token2 is sent to backend 104 via mobile device 102. In some embodiments, TID Key1 and/or TID Key2 are symmetric keys. In some embodiments, TID Key1 and/or TID Key2 are asymmetric keys.

In various embodiments, Matcher ID (also referred herein as "Matcher") is like the Transaction ID (also referred herein as TID) except it is not encrypted. As discussed herein, a TID includes a token and a corresponding key to decode the token. In some embodiments, Matcher ID is a randomly generated token used to match the first authentication information with the second authentication information. In some embodiments, the Matcher ID is used to identify which first authentication information packets are paired to which second authentication information packets. Once the packets are paired, the transaction can be verified by seeing if the decrypted or decoded TIDs from each authentication information packet are equivalent.

In some embodiments, User ID (also referred to herein as UID or Customer ID (CID)) is a unique identifier that is passed from mobile device 102 to secure element 501b (e.g., point-of-user-interaction module 101b) and then read by merchant terminal 501a. This allows a user of mobile device 102 to identify themself to merchant terminal 501a (via secure element 501b). The same is true for the Merchant ID (aka MID), except reversed. For example, MID is passed from merchant terminal 501a to mobile device 102 directly or indirectly via secure element 501b.

As discussed herein, in some embodiments, merchant terminal 501a and secure element 501b are integrated on a common platform. For example, first controller 521b and second controller 521a that perform various functions of secure element 501b and merchant terminal 501a, respectively, are implemented on a single system-on-chip (SoC). In one such embodiment, a user of mobile device 102 identifies themself to point-of-user-interaction apparatus 101, which includes the integrated merchant terminal 501a and secure element 501b.

In some embodiments, backend 104 is not only getting information generated by point-of-user-interaction apparatus 101 but the information is also exchanged between mobile device 102 and point-of-user-interaction apparatus 101 (and between secure element 501b and merchant terminal 501a) to identify the parties performing the transaction. The exchange between mobile device 102 and point-of-user-interaction apparatus 101 is a) a two-way information exchange where b) each party (e.g., mobile device 102 and point-of-user-interaction apparatus 101) can generate dynamic information, and c) each party is connected to a network (e.g., cellular, WiFi, and/or physical ethernet). These three security features allow for mutual verification of each party's location and identity at the point of transaction or sale.

A traditional credit card payment mechanism on a mobile device can generate dynamic information to ensure security and can communicate that data back to a payment terminal, but it is not capable to connect to a network. While smart phones are typically connected to a network, the credit card transactions conducted with smart phones represent the traditional credit card payment mechanism.

The following example illustrates how the exchange of information of various embodiments to identify the parties (customer and merchant) performing the transaction is different from traditional QR code reading. A QR code (or any matrix barcode) can be dynamically generated but lacks a two-way communication as discussed herein with reference to various embodiments. Assume a point-of-user-interaction apparatus 101 can generate a dynamic QR code on display unit 101a (of point-of-user-interaction apparatus 101). That QR code can contain a TID (& MID). Further assume that point-of-user-interaction apparatus 101 (or merchant device 501a) can post the TID to backend 104. In this case, the customer, using their QR code scanner on their mobile device can scan the QR Code and post the TID to backend 104. However, QR code scheme is not capable of accomplishing two-way information exchange specifically for the customer to identify themselves. Even if the roles are reversed, where a merchant device such as point-of-user-interaction apparatus 101 scans a QR code generated on a customer's device, the merchant (e.g., owner of point-of-user-interaction apparatus 101) is unable to identify itself to the customer (e.g., user of mobile device 102).

Figure 6:
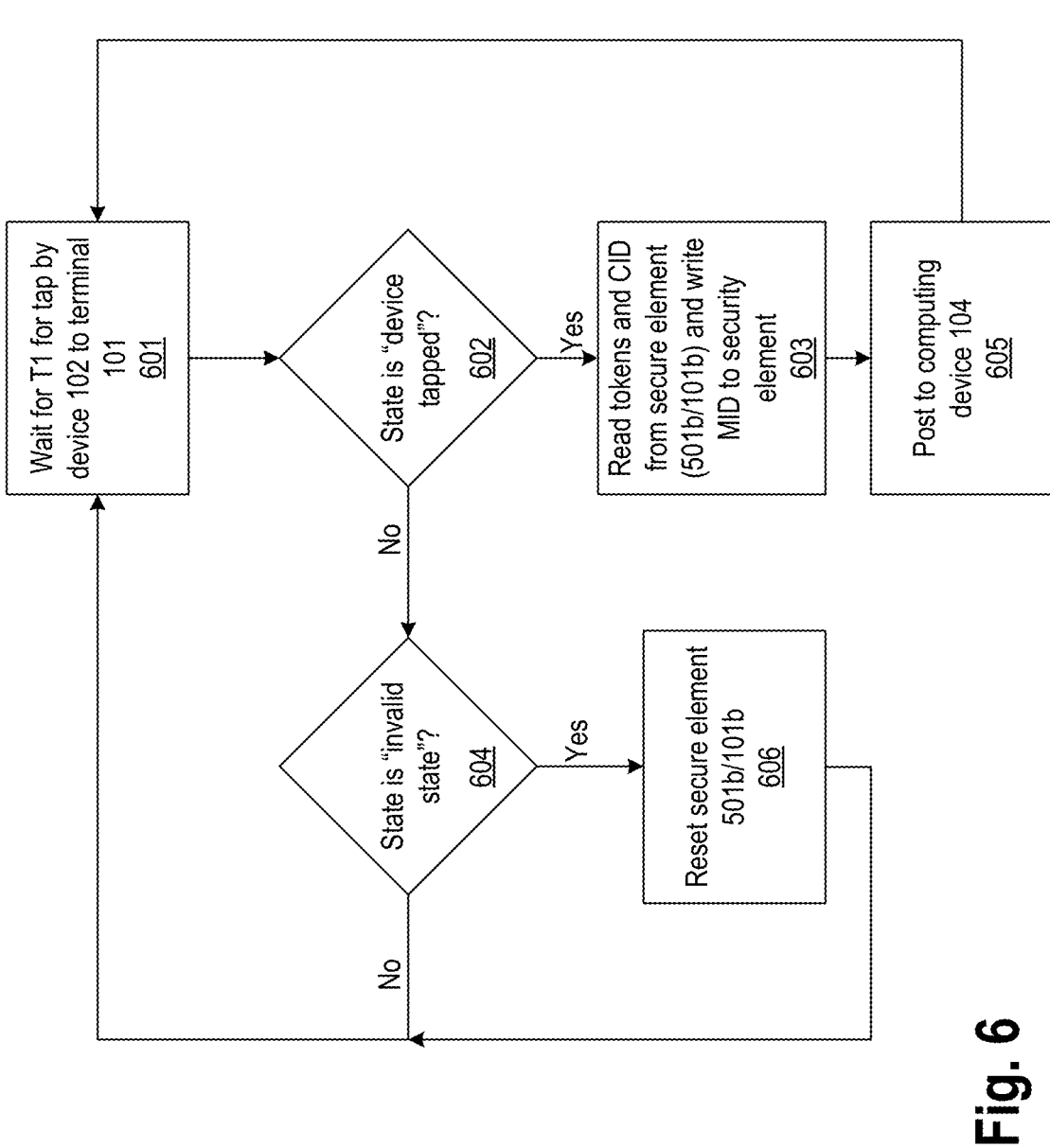
FIG. 6 illustrates a system-level flowchart for secure mobile transaction, in accordance with some embodiments.

FIG. 6 illustrates system-level flowchart 600 for secure mobile transaction, in accordance with some embodiments. While the blocks in flowchart 600 are shown in a particular order, the order can be modified. For example, some blocks may be performed in parallel while some blocks may be performed before others. System-level flowchart 600 involves interactions of point-of-user-interaction apparatus 101, mobile device 102, and backend 104. The operations here can be performed by software, hardware, or a combination of them. At block 601, point-of-user-interaction apparatus 101 and/or mobile device 102 waits for T1 time (e.g., 2 seconds) for tap by mobile device 102 to point-of-user-interaction apparatus 101 (also referred here generally as a merchant terminal). At block 602, point-of-user-interaction apparatus 101 and/or mobile device 102 changes its internal state variable to determine whether after waiting for T1 time, mobile device 102 tapped point-of-user-interaction apparatus 101. If no such tap happened, the process proceeds to block 604, otherwise the process proceeds to block 603. At block 604, point-of-user-interaction apparatus 101 and/or mobile device 102 determines whether its internal state variable is valid. If the internal state is invalid state, the process proceeds to block 606, otherwise the process proceeds to block 601 where the system continues to wait for a tap. At block 606, secure element 521b (or add-on 101b) is reset and the process proceeds to block 601. This allows point-of-user-interaction apparatus 101 to reestablish its function for secure element 521b or add-on 101b. At block 603, after it is determined that a proper tap was detected between mobile device 102 and point-of-user-interaction apparatus 101, the first and second authentication information are procured and provided to backend 104 for decryption or decoding.

For example, mobile device 102 receives the first authentication information (TID Token2 and TID Key1) from point-of-user-interaction apparatus 101 (or secure element 501b). Likewise, point-of-user-interaction apparatus 101 transmits the second authentication information (e.g., TID Token1 and TID Key2) to backend 104. In addition to providing the first and second information to backend 104, User ID is provided by mobile device 102 to point-of-user-interaction apparatus 101, while point-of-user-interaction apparatus 101 provides Matcher ID and Merchant ID to mobile device 102. In various embodiments, point-of-user-interaction apparatus 101 provides the Matcher ID and the User ID to backend 104. In various embodiments, mobile device 102 provides Matcher ID and Merchant ID to backend 104. This exchange of information between mobile device 102 and point-of-user-interaction apparatus 101 allows backend 104 to ascertain that a physical use of mobile device 102 is recognized and a secure transaction is enabled between mobile device 102 and point-of-user-interaction apparatus 101. The exchange of information and reception of that information by backend 104 is illustrated by block 605. The process then continued to wait for a next tap between any mobile device and point-of-user-interaction apparatus 101.

Figure 7:
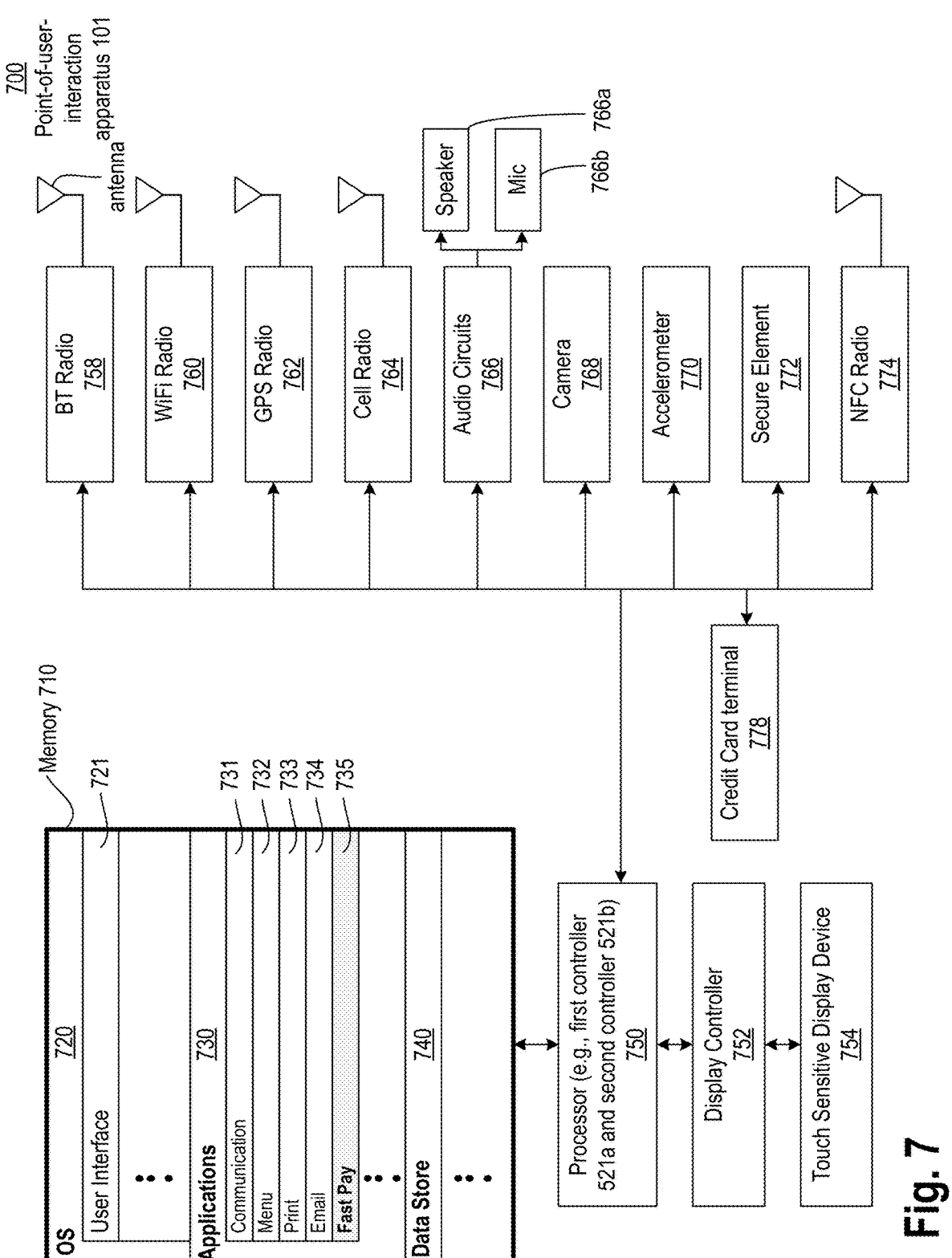
FIG. 7 illustrates the point-of-user-interaction apparatus with software and hardware for secure mobile transaction, in accordance with some embodiments.

FIG. 7 illustrates point-of-user-interaction apparatus 700 (e.g., 101) with software and hardware for secure mobile transaction, in accordance with some embodiments. In some embodiments, point-of-user-interaction apparatus 700 includes processor 750, memory 710, display controller 752, touch sensitive display device 754, Bluetooth (BT) radio 758, WiFi radio 760, GPS radio 762, cellular radio 764, audio circuits 766 (e.g., speaker 766a and Mic 766b), camera 768, accelerometer 770, secure element 772, near-field communications (NFC) radio 774, and credit card terminal 778. In some embodiments, point-of-user-interaction apparatus 700 may be any type of device that includes all or some of the components shown. For example, in some embodiments, point-of-user-interaction apparatus 700 may be a cell phone, a smartphone, a tablet computer, a laptop computer, a dedicated merchant terminal, a point-of-sale terminal, etc. In various embodiments, the radios discussed herein have associated antennas. In some embodiments, the antenna may comprise one or more directional or omnidirectional antennas, including monopole antennas, dipole antennas, loop antennas, patch antennas, microstrip antennas, coplanar wave antennas, or other types of antennas suitable for transmission of Radio Frequency (RF) signals. In some multiple-input multiple-output (MIMO) embodiments, the antennas are separated to take advantage of spatial diversity.

In some embodiments, processor 750 may be any type of processor capable of executing instructions stored in memory 710 and capable of interfacing with the various components shown in FIG. 2. For example, processor 750 may be a microprocessor, a digital signal processor, an application specific processor, or the like. In some embodiments, processor 750 is a component within a larger integrated circuit such as a system on chip (SOC) application specific integrated circuit (ASIC). In some embodiments, processor 750 may include integrated first controller 521*b* and second controller 521*a*. In some embodiments, processor 750 represents two separate controllers—first controller 521*b* and second controller 521*a*.

Display controller 752 provides an interface between processor 750 and touch sensitive display device 754 (e.g., 101*a*). In some embodiments, display controller 752 is integrated within processor 750, and in other embodiments, display controller 752 is integrated within touch sensitive display device 754.

Touch sensitive display device 754 is a display device that includes a touch sensitive surface, sensor, or set of sensors that accept input from a user. For example, touch sensitive display device 754 may detect when and where an object touches the screen, and may also detect movement of an object across the screen. When touch sensitive display device 754 detects input, display controller 752 and processor 750 (in association with user interface component 721) determine the appropriate response. For example, in response to user input, applications may be started, icons may be moved, or fast pay application may be started for secure payment transaction.

Touch sensitive display device 754 may be manufactured using any applicable display technologies, including for example, liquid crystal display (LCD), active-matrix organic light emitting diode (AMOLED), and the like. Further, touch sensitive display device 754 may be manufactured using any application touch sensitive input technologies, including for example, capacitive and resistive touch screen technologies, as well as other proximity sensor technologies.

Bluetooth radio 758 is a type of non-near-field radio capable of communicating on a frequency between 2.402 GHz and 2.480 GHz. Bluetooth is an example of a non-near-field protocol because the wavelength is on the order of 4.5 inches and the intended communication distance is typically much greater than 4.5 inches. Bluetooth radio 758 can communicate on a personal-area network (PAN) with other Bluetooth devices on the personal-area network. In some embodiments Bluetooth radio 758 is omitted.

WiFi radio 760 may be any type of radio capable of communicating over a wireless network. Examples include radios that are compatible with one or more of the Institute of Electrical and Electronics Engineers (IEEE) 802.11 standards. In some embodiments, WiFi radio 760 is omitted. In some embodiments, point-of-user-interaction apparatus 700 uses WiFi radio 760 to communicate with backend 104 and/or mobile device 102.

GPS radio 762 includes a global positioning system (GPS) receiver capable of determining the present location (e.g., latitude and longitude) of point-of-user-interaction apparatus 700. In some embodiments, GPS radio 762 is used to provide location information to communicate with backend 104. Cellular radio 764 may be any type of radio that can communicate within a cellular network. Examples include, but are not limited to, radios that communicate using orthogonal frequency division multiplexing (OFDM), code division multiple access (CDMA), time division multiple access (TDMA), and the like. Cellular radio 764 may operate at any frequency or combination of frequencies without departing from the scope of the present invention. In some embodiments, cellular radio 764 is omitted. In some embodiments, point-of-user-interaction apparatus 700 uses cellular radio 764 to communicate with backend 104. In some embodiments, point-of-user-interaction apparatus 700 uses a wired communication means to communicate with backend 104. For example, point-of-user-interaction apparatus 700 uses an ethernet cable to communicate with backend 104. In various embodiments, audio circuits 766 provide an interface between processor 750 and audio devices such as speaker 766*a* and microphone mic 766*b*.

Camera 768 may be any camera suitable for use in a mobile device. For example, camera 768 may include a CMOS sensor with optics or any other type of image capture device at any resolution. Camera 768 may be operated by a camera software application (not shown). Accelerometer 770 detects motion of point-of-user-interaction apparatus 700 and may be used by any software application.

In some embodiments, secure element 772 (e.g., secure element 501*b*) provides secure information storage. In some embodiments, secure element 772 is a smartcard compatible secure element commonly found in credit card applications and/or security applications. NFC radio 774 provides near-field communications capability between point-of-user-interaction apparatus 700 and other devices nearby (e.g., mobile device 102). In some embodiments, NFC radio 774 may operate at 13.56 megahertz, although this is not a limitation of the present invention. In some embodiments, point-of-user-interaction apparatus 700 uses NFC radio 274 to communicate with mobile device 102.

In some embodiments, secure element 772 is combined with NFC radio 774 in a single integrated circuit such as a smartcard controller. In other embodiments, secure element 772, or a combination of secure element 772 and NFC radio 774 are integrated into another semiconductor device such as processor 750. In some embodiments, secure element 772 includes applets, keys and digital certificates. Digital certificates are used to validate the identity of a certificate holder. Certificate authorities typically issue digital certificates. In some embodiments, the secure transaction system makes available one or more applets, keys, and/or digital certificates to create a trusted relationship with mobile device 102 to authenticate or valid the transaction.

Examples of smart card controllers that combine secure element 772 with NFC radio 774 are the "SmartMX" controllers sold by NXP Semiconductors N.V. of Eindhoven, The Netherlands. In some embodiments, secure element 772 has an ISO/IEC 7816 compatible interface that communicates with other components within point-of-user-interaction apparatus 700 (e.g., processor 750), although this is not a limitation of the present invention. Further, in some embodiments, NFC radio 774 has an ISO/IEC 14443 contactless interface.

Point-of-user-interaction apparatus 700 may include many other circuits and services that are not specifically shown in FIG. 2. For example, in some embodiments, point-of-user-interaction apparatus 700 may include an additional camera, haptic feedback devices, and the like. Any number and/or type of circuits and services may be included within point-of-user-interaction apparatus 700 without departing from the scope of the various embodiments.

Memory 710 may include any type of memory device. For example, memory 710 may include volatile memory such as static random-access memory (SRAM), or nonvolatile memory such as FLASH memory. Memory 710 is encoded with (or has stored therein) one or more software modules (or sets of instructions), that when accessed by processor 750, result in processor 750 performing various functions. In some embodiments, the software modules stored in memory 710 may include an operating system (OS) 720 and applications 730. Applications 730 may include any number or type of applications. Examples provided in FIG. 2 include a communication application 731, a menu 732, a print application 733, an email application 734, and a fast pay or secure transaction application 735. Memory 710 may also include any amount of space dedicated to data storage 740.

Operating system 720 may be a mobile device operating system such as an operating system to control a mobile phone, smartphone, tablet computer, laptop computer, or the like. As shown in FIG. 2, operating system 720 includes user interface component 721. Operating system 720 may include many other components without departing from the scope of the present invention.

User interface component 721 includes processor instructions that cause point-of-user-interaction apparatus 700 to display content on touch sensitive display device 754, recognize user input, and to provide the user input to applications. User interface component 721 also includes instructions to display menus, move icons, and manage other portions of the display environment.

Communication application 731 may be an application that controls a cellular radio 764 and/or other radios. Menu application 732 includes software that organizes a list of offerings. For example, menu application 732 may include a list of items for sale where point-of-user-interaction apparatus 700 is being employed. Printer application 733 may be a software application that prints files or documents that are stored in data store 740. Email application 734 may be a software application to send and receive electronic mail.

Fast pay or secure transaction application 735 may be a software application that communicates with a banking service to allow banking functions such as balance inquiries, funds transfers, bill payment and the like. Fast pay or secure transaction application 735 may be a downloaded "thick" application, or may be a "thin" application that uses internet browser functionality. Other application examples include applications that store an identity such as a passport or a building access identity.

In some embodiments, Fast Pay or secure transaction application 735 includes processor instructions that allow point-of-user-interaction apparatus 700 to process payments from mobile devices. For example, fast pay or secure transaction application 735 may include processor instructions that handle access to one or more payment instruments such as credit cards, debit cards, and pre-paid cards. In some embodiments, fast pay or secure transaction application 735 communicates with smartcard secure element 772 and/or NFC radio 774 within point-of-user-interaction apparatus 700. For example, fast pay or secure transaction 735 may store and access payment identities in smartcard secure element 772 and allow proximity payments using NFC radio 774.

Each of the above-identified applications corresponds to a set of instructions for performing one or more functions described above. These applications (sets of instructions) need not be implemented as separate software programs, procedures or modules, and thus various subsets of these applications may be combined or otherwise re-arranged in various embodiments. For example, communication application 731 may be combined with email application 734. Furthermore, memory 710 may store additional applications (e.g., video players, camera applications, etc.), and data structures not described above.

It should be noted that point-of-user-interaction apparatus 700 is presented as an example of a merchant terminal device, and that point-of-user-interaction apparatus 700 may have more or fewer components than shown, may combine two or more components, or may have a different configuration or arrangement of components. For example, point-of-user-interaction apparatus 700 may include many more components such as sensors (optical, touch, proximity etc.), or any other components suitable for use in a point-of-sale merchant terminal, a voting machine, etc.

FIG. 8 illustrates flowchart 800 of a method performed by point-of-user-interaction apparatus 101 for secure mobile transaction, in accordance with some embodiments. While the various blocks are shown in a particular order, the order can be modified. For example, some blocks may be performed in parallel while some blocks may be performed before others. The various blocks here can be performed by software, hardware, or a combination of them.

At block 802, point-of-user-interaction apparatus 101 transmits (e.g., wirelessly) a communication message to mobile device 102, wherein the communication message is stored in a memory, wherein the memory is communicatively coupled to a processor circuitry. In some embodiments, the communication message comprises a near-field communication (NFC) data exchange format (NDEF) tag. At block 804, point-of-user-interaction apparatus 101 generates the first authentication information (e.g., TID Token2 and TID Key1) and the second authentication information (e.g., TID Token1 and TID Key2). At block 806, point-of-user-interaction apparatus 101 transmits the first authentication information to mobile device 102. At block 808, point-of-user-interaction apparatus 101 transmits the second authentication information to backend 104. At block 810, point-of-user-interaction apparatus 101 displays an application to communicate with a user of mobile device 102. In some embodiments, point-of-user-interaction apparatus 101 instructs at least one or more interfaces to transmit the first authentication information to mobile device 102. In some embodiments, point-of-user-interaction apparatus 101 instructs at least one or more interfaces to transmit the second authentication information to backend 104. As discussed herein, backend 104 authenticates a transaction between point-of-user-interaction apparatus 101 and mobile device 101 via the first authentication information and the second authentication information.

At block 812, point-of-user-interaction apparatus 101 sends a unique identification (e.g., Merchant ID) to backend 104. As discussed herein, an exchange of IDs takes place originating from mobile device 102 and point-of-user-interaction apparatus 101 to verify the transaction and the tap.

In some embodiments, the method comprises modifying the communication message. For example, the NFC tag can be modified. In some embodiments, the method further comprises generating a first identification (e.g., Matcher ID or matcher token). In some embodiments, point-of-user-interaction apparatus 101 directly provides the first identification to backend 104. In some embodiments, point-of-user-interaction apparatus 101 generates a first identification (e.g., matcher token), wherein the first identification is used to match the first authentication information with the second authentication information. In some embodiments, the first identification is transmitted by point-of-user-interaction apparatus 101 to mobile device 102. In various embodiments, mobile device 102 provides the first identification to backend 104.

In various embodiments, there is an exchange of identifications between mobile device 102 and point-of-user-interaction apparatus 101 to further secure the transaction between mobile device 102 and point-of-user-interaction apparatus 101 caused by a tap. For example, mobile device 102 generates a second identification (e.g., customer ID (also referred to as user ID)) which is a unique identification. In various embodiments, the first identification is provided to computing device 104 (e.g., backend 104) via mobile device 102. The second identification is provided to backend device 102 via point-of-user-interaction apparatus 101, in accordance with some embodiments. The second identification is used to identify mobile device 102 to point-of-user-interaction apparatus 101. In some embodiments, point-of-user-interaction apparatus 101 generates a second identification (e.g., merchant ID) which is a unique identification. In various embodiments, the first identification is provided to computing device 104 (e.g., backend 104) via point-of-user interaction apparatus 101. The second identification is provided to backend device 104 via mobile device 102. The second identification is used to identify the mobile device to the point-of-user-interaction apparatus.

Continuing with this example, which can be modified to use other forms of IDs, the second identification generated by mobile device 102 can be provided to backend 104 via point-of-user-interaction apparatus 101. The second identification (herein also referred to as a third identification) is generated by point-of-user-interaction apparatus 101 is provided to backend 104 via mobile device 102. As such, backend device 104 receives the second identifications (also referred to as the second and third identifications) from two different sources and via two different paths. The second identifications (also referred to as the second and third identifications) can be a user ID, merchant ID, or other forms of IDs (such as encrypted IDs). The second and third identifications are usually the same IDs but can be different too. For example, the third identification is an encrypted form of the second identification or vice versa. The encryption can take place on any suitable device. For example, the place where the ID resides and/or originates is where the ID can be encrypted. In another example, a device transmitting the ID may encrypt the ID for subsequent transmission. The second identifications, in one example, is used to identify the parties involved in the transaction. This exchange of second identifications in such manner further provides a secure authentication mechanism to authenticate the transaction upon the tap. The exchange of second identifications may occur via any suitable means such as application programmable interfaces (APIs), NFC communication, wireless or wired means. By exchange of the second identifications, backend 104 can authenticate the transaction and/or the tap, in accordance with various embodiments.

At block 814, point-of-user-interaction apparatus 101 receives a notification of a valid transaction between mobile device and the point-of-user-interaction apparatus after the computing device authenticates the transaction.

Figure 9:
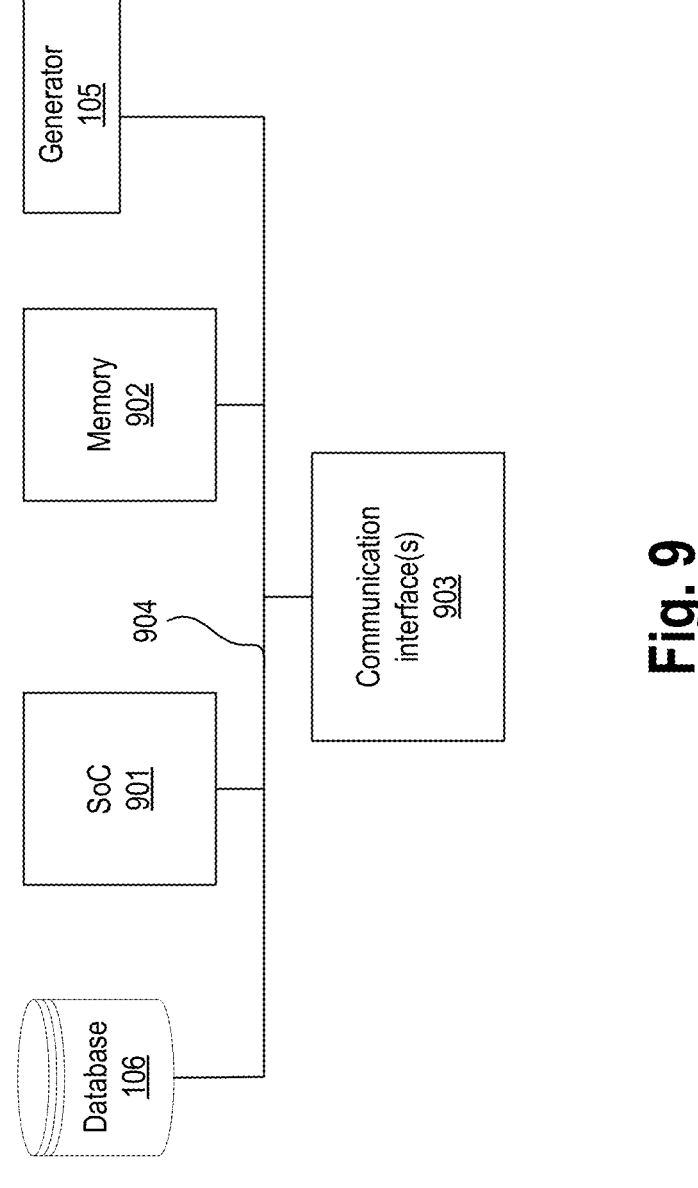
FIG. 9 illustrates a computing device or a backend server for authenticating the transaction between the mobile device and the point-of-user-interaction apparatus, in accordance with some embodiments.

FIG. 9 illustrates a computing device or a backend server 900 (or herein backend 104) for authenticating the transaction between the mobile device and the point-of-user-interaction apparatus, in accordance with some embodiments. In some embodiments, backend server 900 comprises system-on-chip (SoC) 901, memory 902, communication interfaces 903, and interconnect network 904. In some embodiments, database 106 is part of memory 902 or a separate memory. In some embodiments, SoC 901 comprises one or more processors, memory, communication interface, voltage regulator(s), etc. Each processor may include one or more processor cores to execute the instructions.

In some embodiments, backend server 900 comprises a first communication interface to allow SoC 901 to communicate with mobile device 102. In some embodiments, the first communication interface receives a first authentication (TID Token2 and TID Key1) information from mobile device 102. In some embodiments, backend server 900 comprises a second communication interface to allow SoC 901 to communicate with point-of-user-interaction apparatus 101. In some embodiments, the second communication interface receives a second authentication information (TID Token1 and TID Key2) from point-of-user-interaction apparatus 101. In some embodiments, SoC 901 authenticates a transaction between mobile device 102 and point-of-user-interaction apparatus 101 by application of the first authentication information and the second authentication information.

In various embodiments, backend 104 receives a first identification (e.g., Matcher ID). In some embodiments, point-of-user-interaction apparatus 101 directly provides the first identification to backend 104. In various embodiments, the first identification is used to match the first authentication information with the second authentication information. In some embodiments, backend 104 also receives a second identification (e.g., User ID) which is a unique identification. Continuing with this example, which can be modified to use other forms of IDs, the second identification generated by mobile device 102 can be provided to the backend 104 via point-of-user-interaction apparatus 101, and the second identification generated by point-of-user-interaction apparatus 101 is provided to backend 104 via mobile device 102. As such, backend 104 receives the second identifications from two different sources and via two different paths. The second identifications can be a user ID, merchant ID, or other forms of IDs. The second identifications, in one example, is used to identify the parties involved in the transaction. This exchange of second identifications in such manner further provides a secure authentication mechanism to authenticate the transaction upon the tap. The exchange of second identifications may occur via any suitable means such as application programmable interfaces (APIs), NFC communication, wireless or wired means. By exchange of the second identifications, backend 104 can authenticate the transaction, in accordance with various embodiments.

As such, fake transactions or fraudulent transactions of credit card payments or online payments can be tracked. In some embodiments, SoC 901 notifies mobile device 102 of the validity of the transaction via the first communication interface. In some embodiments, SoC 901 notifies point-of-user-interaction apparatus 101 of the validity of the transaction via the second communication interface. In some embodiments, the first communication interface comprises a wireless interface. In some embodiments, the second communication interface comprises a network interface.

FIG. 10 illustrates flowchart 1000 of a method performed by the computing device or the backend server (e.g., backend 104) for authenticating the transaction between the mobile device and the point-of-user-interaction apparatus, in accordance with some embodiments. While the various blocks are shown in a particular order, the order can be modified. For example, some blocks may be performed in parallel. The various blocks here can be performed by software, hardware, or a combination of them.

At block 1002, backend 104 receives the first authentication information (TID Token2 and TID Key1) from mobile device 102. At block 1004, backend 104 receives the second authentication information (TID Token1 and TID Key2) from point-of-user-interaction apparatus 101. At block 1006, backend 104 authenticates a transaction between mobile device 102 and from point-of-user-interaction apparatus 101.

At block 1008, backend 104 receives identifications from point-of-user-interaction apparatus 101 and mobile device 102. As discussed herein, an exchange of IDs takes place originating from mobile device 102 and point-of-user-interaction apparatus 101 to verify the transaction and the tap.

In some embodiments, the method comprises receiving a first identification (e.g., Matcher ID) from mobile device 102. The first identification is used to match the first authentication information with the second authentication information. In some embodiments, the method further comprises receiving a second identification (e.g., User ID) which is a unique identification from point-of-user-interaction apparatus. In some embodiments, backend 104 receives the second identification via point-of-user-interaction apparatus 101, which gets it from mobile device 102. The second identification is used to identify mobile device 102 to point-of-user-interaction apparatus 101.

Continuing with this example, which can be modified to use other forms of IDs, the second identification generated by mobile device 102 can be provided to backend 104 via point-of-user-interaction apparatus 101. The second identification (herein also referred to as a third identification) is generated by point-of-user-interaction apparatus 101 is provided to backend 104 via mobile device 102. As such, backend device 104 receives the second identifications (also referred to as the second and third identifications) from two different sources and via two different paths. The second identifications (also referred to as the second and third identifications) can be a user ID, merchant ID, or other forms of IDs (such as encrypted IDs). The second and third identifications are usually the same IDs but can be different too. For example, the third identification is an encrypted form of the second identification or vice versa. The encryption can take place on any suitable device. For example, the place where the ID resides and/or originates is where the ID can be encrypted. In another example, a device transmitting the ID may encrypt the ID for subsequent transmission. The second identifications, in one example, is used to identify the parties involved in the transaction. This exchange of second identifications in such manner further provides a secure authentication mechanism to authenticate the transaction upon the tap. The exchange of second identifications may occur via any suitable means such as application programmable interfaces (APIs), NFC communication, wireless or wired means. By exchange of the second identifications, backend 104 can authenticate the transaction and/or the tap, in accordance with various embodiments.

At block 1010, backend 104 notifies mobile device 102 and from point-of-user-interaction apparatus 101 about a validity of the transaction.

FIG. 11 illustrates another system-level flowchart 1100 for secure mobile transaction, in accordance with some embodiments. While the various blocks are shown in a particular order, the order can be modified. For example, some blocks may be performed in parallel. The various blocks here can be performed by software, hardware, or a combination of them. System-level flowchart 1100 shows the transaction cycle and the various events to complete a secure transaction between mobile device 102 and point-of-user-interaction apparatus 101. At block 1101, the system polls to a tap between mobile device 102 and point-of-user-interaction apparatus 101. This process is like the process described in block 601 of FIG. 6. Referring to FIG. 11, at block 1102, a customer or user of mobile device 102 taps point-of-user-interaction apparatus 101. When the tap is registered, a number of events occur as illustrated in block 1103. For example, user ID (UID) from mobile device 102 is received by backend 104 via point-of-user-interaction apparatus 101 and written to persistent memory (e.g., database 106 or memory 902). At block 1103, point-of-user-interaction apparatus 101 randomly generates matcher ID or matcher token (MT), transaction ID (TID), key 1, and encrypted key 2. In various embodiments, key 1 is used to encrypt TID. In some embodiments, the TID is encrypted twice—once with each key. As such, there are two encrypted tokens TID1 and TID2. In various embodiments, MT, TID2, and Key 1 are provided to backend 104 via mobile device 102, and are written to persistent memory (e.g., database 106 or memory 902). Any suitable scheme for encryption may be used to encrypt the tokens.

In various embodiments, TID1 and Key2 are provided to backend 104 via point-of-user-interaction apparatus 101 and are written to a random-access memory or the persistent memory. In addition to TID1 and Key2, backend 104 also receives UID of mobile device 102 via point-of-user-interaction apparatus 101. The information received by backend 104 via mobile device 102 and point-of-user-interaction apparatus 101 is used to authenticate the transaction that was initiated by the tap. At block 1104, backend 104 authenticates the transaction by decrypting TID1 and TID2 with their respective keys, and transmits the MT, TID1, MID, and Key2 to mobile device 102. In some embodiments, in block 1102, mobile device 102 sends a command containing the user ID. Then the actions described in 1103 are executed within the point-of-user-interaction apparatus 101 (specifically within the secure element 501b), in accordance with some embodiments. Then the secure element 501b issues a response command to the command issued by mobile device 102. This response command contains the information described in block 1104. In some embodiments, point-of-user-interaction apparatus 101 (also referred to as merchant terminal 101a) waits or polls. For example, merchant terminal 501a polls via, for example, ISO7816 contact interface to check the status of secure element 501b to determine whether a customer (e.g., mobile device 102) has tapped. If a customer tapped, the process proceeds to block 1105. At block 1105, point-of-user-interaction apparatus 101 gets the MT, TID2, Key1, UID, and writes the next MID, and process continues.

FIG. 12 illustrates system-level flowchart 1200 for secure transaction at a restaurant or a service center, in accordance with some embodiments. While the various blocks are shown in a particular order, the order can be modified. For example, some blocks may be performed in parallel while some blocks may be performed before others. The various blocks here can be performed by software, hardware, or a combination of them. At block 1201, a customer enters a restaurant and taps mobile device 102 (also referred to as a customer device or user device) to a point-of-user-interaction apparatus 101. This may happen even when no financial transaction is made because the customer has not bought or ordered anything from the restaurant. This first tap is to register the customer with the restaurant so that the customer can be billed later.

At block 1202, customer seats and selects items from a menu. The menu can be an online menu or a physical menu. At block 1203, after eating or buying the products, customer taps point-of-user-interaction apparatus 101 or similar apparatus, which is communicatively coupled to point-of-user-interaction apparatus 101. This is the second tap. Upon the second tap, the process proceeds to blocks 1205 and 1206 where point-of-user-interaction apparatus 101 sends the first authentication information to mobile device 102 and sends the second authentication information to backend 104. At block 1207, mobile device 102 sends the first authentication information to backend 104.

In various embodiments, as indicated with reference to block 1208, there is an exchange of identifications (IDs) between mobile device 102 and point-of-user-interaction apparatus 101 to further secure the transaction between mobile device 102 and point-of-user-interaction apparatus 101 caused by a tap. Each party (e.g., mobile device 102 and point-of-user-interaction apparatus 101) transmits the other party's identification (ID) to backend 104. As such, backend 104 can authenticate the transaction and the parties involved in that transaction, for example.

In one instance, a first identification (e.g., matcher token) generated by point-of-user-interaction apparatus 101 is provided to mobile device 102, which in turn provides the first identification to backend 104. In some embodiments, point-of-user-interaction apparatus 101 directly provides the first identification to backend 104. Likewise, mobile device 102 generates a second identification (e.g., customer ID) and provides it to point-of-user-interaction apparatus 101, which in turn provides the second identification to backend 104. Continuing with this example, which can be modified to use other forms of IDs, the second identification generated by mobile device 102 can be provided to the backend 104 via point-of-user-interaction apparatus 101, and the second identification generated by point-of-user-interaction apparatus 101 is provided to backend 104 via mobile device 102. As such, backend 104 receives the second identifications from two different sources and via two different paths. The second identifications can be a user ID, merchant ID, or other forms of IDs. The second identifications, in one example, is used to identify the parties involved in the transaction. This exchange of second identifications in such manner further provides a secure authentication mechanism to authenticate the transaction upon the tap. The exchange of second identifications may occur via any suitable means such as application programmable interfaces (APIs), NFC communication, wireless or wired means. By exchange of the second identifications, backend 104 can authenticate the transaction, in accordance with various embodiments.

At block 1209, mobile device 102 and point-of-user-interaction apparatus 101 receive notification about the validity of the transaction that started with the first tap and ended with the second tap. Once the transaction is deemed valid, customer leaves as indicated by block 1210.

The various flowcharts discussed herein can be part of a program software code. Program software code/instructions associated with various embodiments may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with processes of various embodiments are executed by a processor system.

In some embodiments, the program software code/instructions associated with various embodiments are stored in a computer executable storage medium and executed by a processor. Here, computer executable storage medium is a tangible machine-readable medium that can be used to store program software code/instructions and data that, when executed by a computing device, causes one or more processors to perform a process.

The tangible machine-readable medium may include storage of the executable software program code/instructions and data in various tangible locations, including for example ROM, volatile RAM, non-volatile memory and/or cache, and/or other tangible memory as referenced in the present application. Portions of this program software code/instructions and/or data may be stored in any one of these storage and memory devices. In some embodiments, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions associated with the various embodiments can be obtained in their entirety prior to the execution of a respective software program or application. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines, or other sequences of instructions or organization of sequences of instructions, by way of example. Thus, it is not required that the data and instructions be on a tangible machine-readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical, or other forms of propagating signals, such as carrier waves, infrared signals, digital signals, etc., through such tangible communication links.

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus, which comprises the device.

Throughout the specification, and in the claims, the term "connected" may generally refer to a direct connection, such as electrical, mechanical, or magnetic connection between the things that are connected, without any intermediary devices.

The term "coupled" may generally refer a direct or indirect connection, such as a direct electrical, mechanical, or magnetic connection between the things that are connected or an indirect connection, through one or more passive or active intermediary devices.

The term "adjacent" here may generally refer to a position of a thing being next to (e.g., immediately next to or close to with one or more things between them) or adjoining another thing (e.g., abutting it).

The term "circuit" or "module" may generally refer to one or more passive and/or active components that are arranged to cooperate with one another to provide a desired function. A module may also refer to one or more blocks of software code that perform one or more functions.

The term "signal" may generally refer to at least one current signal, voltage signal, magnetic signal, or data/clock signal. The meaning of "a," "an," and "the" include plural references. The meaning of "in" includes "in" and "on."

Here, the term "analog signal" may generally refer to any continuous signal for which the time varying feature (variable) of the signal is a representation of some other time varying quantity, i.e., analogous to another time varying signal.

Here, the term "digital signal" may generally refer to a physical signal that is a representation of a sequence of discrete values (a quantified discrete-time signal), for example of an arbitrary bit stream, or of a digitized (sampled and analog-digital converted) analog signal.

The terms "substantially," "close," "approximately," "near," and "about," may generally refer to being within +/−10% of a target value. For example, unless otherwise specified in the explicit context of their use, the terms "substantially equal," "about equal," and "approximately equal" mean that there is no more than incidental variation between among things so described. In the art, such variation is typically no more than +/−10% of a predetermined target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

Here the term "mobile device" or an "interacting device" may generally refer to a smart device that can execute one or more software. A mobile device or an interacting device may be any device capable of communicating over a communication interface (e.g., a radio, Near-field Communication (NFC), Bluetooth, cellular, wired means such as Universal Serial Bus (USB), etc.). Examples of the mobile device include a smart phone, a tablet, a watch, or other wearable devices.

As used herein, the term "near-field" or "Near-field Communication (NFC)" may generally refer to communication protocols and compatible radios in which the maximum intended communication distance is less than the wavelength of the radio wave used for that communication. ISO 14443 (NFC) is an example of near-field because the wavelength is on the order of 870 inches and the intended communication distance is only a few inches. All communications protocols and compatible radios that are not near-field are referred to herein as "non-near-field." An example of a non-near-field protocol is BLUETOOTH' because the wavelength is on the order of 4.5 inches and the intended communication distance is typically much greater than 4.5 inches. The use of the term "non-near-field radio" is not meant to imply that the distance of communication cannot be less than the wavelength for the non-near-field radio.

Here the term "tap" may generally refer to an action that brings one device close enough to another device to engage a communication protocol (e.g., an NFC communication). The two devices may be in direct contact with one other or substantially close to trigger a communication between the two devices. The communication may be one way or bidirectional.

The term "transaction" as used herein may generally refer to the process of accepting and/or operating on a point-of-sale transaction. For example, a transaction may include tallying votes on a validated ballot, or the acceptance of a point-of-sale operation, acceptance of an e-commerce deal, signing a digital and/or physical document, registering with an organization, attendance verification, security verification at an office, airport, or any point of entry or exit, etc.

The terms "Transaction ID" or "TID" may generally refer to software or hardware based identifier which includes a token and a corresponding key.

The terms "TID Token" (e.g., TID Token1 and TID Token2) may generally refer to a software or hardware based variable-length format of information associated with the transaction described herein. A TID token may comprise a key value and a control information in a data section of that information. For example, a TID Token may comprise of a header that defines the type of token and security algorithm used; a payload that contains user information and metadata such as token duration and time of creation; and a signature to verify the sender's identity and the message's authenticity. A TID Token may be an assertion of a user's identity.

The terms "TID Key" (e.g., TID Key1 and TID Key2) may generally refer to a software or hardware set of bits that are used to decrypt or encrypt a token. For example, TID Key1 may be used to encrypt and decrypt TID Token1.

The terms "Matcher," "Matcher ID," or "Matcher Token" or "MT" may generally refer to a unique identifier (e.g., a 16-byte identifier) used to pair transaction receipts so that the transaction receipts may be used to decrypt each other's TIDs. A Matcher may be similar to a TID but is not encrypted in some examples.

The terms "User ID," "UID," "Customer ID," or "CID" may generally refer to a unique identification for a user device such as a mobile device. An example of a User ID may be a media access control address (MAC address) or serial number assigned by the Original Equipment Manufacturer (OEM).

The terms "Merchant ID" or "MID" may generally refer to a unique identification for a merchant device such as a point-of-user-interaction terminal or point-of-sale equipment. An example of a Merchant ID may be a media access control address (MAC address), or serial number assigned by the Original Equipment Manufacturer (OEM).

The term "security element" or "secure element" may generally refer to a point-of-user-interaction module that provides secure information storage. Secure element may include an NFC radio and a controller. The secure element may include one or more interfaces. For example, the secure element may include an NFC radio with an enhancement circuit or controller with a secure function that includes applets, keys, or digital certificates to validate an identity of a certificate holder. Secure element may have ability to communicate with a user device (e.g., a mobile device) and a merchant terminal.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art considering the foregoing description. The embodiments of the disclosure are intended to embrace all such alternatives, modifications, and variations as to fall within the broad scope of the appended claims.

Following examples are provided that illustrate the various embodiments. The examples can be combined with other examples. As such, various embodiments can be combined with other embodiments without changing the scope of the invention. For example, example 7 can be combined with example 3 or 2, or both.

Example 1: A mobile device comprising: an antenna to detect or read a communication target from a point-of-user-interaction apparatus near the mobile device; a reader to initiate a transmission of a command to the point-of-user-interaction apparatus, and to read a response from the point-of-user-interaction apparatus, wherein the reader coupled to the antenna; a display unit that changes its display based on the response from the point-of-user-interaction apparatus and/or the communication target; and a circuitry that executes instructions to receive a first authentication information from the point-of-user-interaction apparatus, wherein the point-of-user-interaction apparatus is to transmit a second authentication information to a computing device, wherein the circuitry executes instructions to send the first authentication information to the computing device, wherein the computing device is to authenticate a transaction between the point-of-user-interaction apparatus and the mobile device via the first authentication information and the second authentication information, wherein the computing device is to notify the circuitry of a valid transaction between mobile device and the point-of-user-interaction apparatus after the computing device authenticates the transaction.

Example 2: The mobile device of example 1, wherein the first authentication information includes: a first key, associated with a first cryptographic token, from the point-of-user-interaction apparatus; and a second cryptographic token, associated with a second key, from the point-of-user-interaction apparatus.

Example 3: The mobile device of example 2, wherein the second authentication information includes the second key and the first cryptographic token.

Example 4: The mobile device of example 1, wherein the point-of-user-interaction apparatus generates a first identification, wherein the first identification is used to match the first authentication information with the second authentication information.

Example 5: The mobile device of example 4, wherein the circuitry is to generate a second identification which is a second unique identification, wherein the second identification is provided to the computing device via the point-of-user-interaction apparatus, wherein the second identification is used to identify the mobile device to the point-of-user-interaction apparatus.

Example 6: The mobile device of example 5, wherein the point-of-user-interaction apparatus is to generate a third identification which is a third unique identification, wherein the third identification is provided to the computing device via the mobile device.

Example 7: The mobile device of example 6, wherein the second unique identification is same as the third unique identification, or wherein the second unique identification is different than the third unique identification.

Example 8: The mobile device of example 1, wherein the communication target comprises a near-field communication (NFC) data exchange format (NDEF) target.

Example 9: The mobile device of example 1, wherein the antenna continuously or regularly initiates a transmission and listens for a response from communication targets near the mobile device.

Example 10: The mobile device of example 1, wherein the transmission and the response are near-field communications.

Example 11: The mobile device of example 1, wherein the reader comprises a first application programmable interface to initiate the transmission and to read the response.

Example 12: The mobile device of example 11 comprises a second application programmable interface to issue a notification or a hyperlink based on the response, wherein a user interaction with the notification or the hyperlink is to cause the display of the application.

Example 13: The mobile device of example 12, wherein the notification or the hyperlink is transmitted from the communication target.

Example 14: The mobile device of example 12 comprises a camera or a biometric sensor to authenticate a user of the mobile device based on a user's interaction with the notification or the hyperlink.

Example 15: The mobile device of example 1 comprises a camera or a biometric sensor to authenticate a user of the mobile device.

Example 16: The mobile device of example 1, wherein the valid transaction is a financial transaction or wherein the valid transaction is a voting ballot cast.

Example 17: The mobile device of example 2, wherein the computing device is a first computing device, and wherein the point-of-user-interaction apparatus is to transmit the first cryptographic token and the second key to a second computing device, wherein the second computing device is to transmit the first cryptographic token and the second key to the first computing device.

Example 18: The mobile device of example 2, wherein the computing device is to decode the second cryptographic token with the second key, wherein the computing device is to notify the circuitry of a validity of the transaction between the mobile device and the point-of-user-interaction apparatus after the first cryptographic token and the second cryptographic token are decoded.

Example 19: A method for secure and fast transaction between a mobile device and a point-of-user-interaction apparatus, the method comprising: detecting or reading a communication target from the point-of-user-interaction apparatus near the mobile device; initiating a transmission of a command to the point-of-user-interaction apparatus; reading a response from the point-of-user-interaction apparatus in response to the command; displaying an application based on the response from the point-of-user-interaction apparatus and/or the communication target; receiving a first authentication information from the point-of-user-interaction apparatus; transmitting the first authentication information to a computing device, wherein the computing device is to receive a second authentication information directly or indirectly from the point-of-user-interaction apparatus, wherein the computing device is to authenticate a transaction between the point-of-user-interaction apparatus and the mobile device via the first authentication information and the second authentication information; and receiving a notification, from the computing device, of a valid transaction between the mobile device and the point-of-user-interaction apparatus after the computing device authenticates the transaction.

Example 20: The method of example 19, wherein the first authentication information includes: a first key, associated with a first cryptographic token, from the point-of-user-interaction apparatus; and a second cryptographic token, associated with a second key, from the point-of-user-interaction apparatus, wherein the second authentication information includes the second key and the first cryptographic token.

Example 21: The method of example 19, wherein the communication target comprises a near-field communication (NFC) data exchange format (NDEF) target.

Example 22: The method of example 19, wherein detecting or reading the communication target comprises continuously or regularly listening for communication targets near the mobile device.

Example 23: The method of example 19, wherein the transmission and the response are near-field communications.

Example 24: The method of example 19, wherein reading the response comprises operating a first application programmable interface to initiate the transmission and to read the response.

Example 25: The method of example 24 comprises operating a second application programmable interface to issue a notification or a hyperlink based on the response, wherein a user interaction of notification or the hyperlink is to cause the display of the application, wherein the notification or the hyperlink is embedded in the communication target, wherein the valid transaction is a financial transaction, or a voting ballot.

Example 26: The method of example 20, comprising: transmitting the first key and the second cryptographic token to the computing device, wherein the computing device is to decode the second cryptographic token with the second key; and receiving a notification of a valid transaction between the mobile device and the point-of-user-interaction apparatus after the first cryptographic token and the second cryptographic token are decoded.

Example 27: The method of example 19, wherein the point-of-user-interaction apparatus generates a first identification, wherein the first identification is used to match the first authentication information with the second authentication information.

Example 28: The method of example 27 comprising generating a second identification which is a second unique identification, wherein the second identification is provided to the computing device via the point-of-user-interaction apparatus, wherein the second identification is used to identify the mobile device to the point-of-user-interaction apparatus.

Example 29: The method of example 28, wherein the point-of-user-interaction apparatus is to generate a third identification which is a third unique identification, wherein the third identification is provided to the computing device via the mobile device.

Example 30: The method of example 29, wherein the second unique identification is same as the third unique identification, or wherein the second unique identification is different than the third unique identification.

Example 31: A machine-readable storage media having one or more machine-readable instructions stored therein, that when executed, cause one or more machines to perform a method for secure and fast transaction between a mobile device and a point-of-user-interaction apparatus, the method comprising: detecting or reading a communication target from the point-of-user-interaction apparatus near the mobile device; initiating a transmission of a command to the point-of-user-interaction apparatus; reading a response from the point-of-user-interaction apparatus in response to the command; displaying an application based on the response from the point-of-user-interaction apparatus and/or the communication target; receiving a first authentication information from the point-of-user-interaction apparatus; transmitting the first authentication information to a computing device, wherein the computing device is to receive a second authentication information directly or indirectly from the point-of-user-interaction apparatus, wherein the computing device is to authenticate a transaction between the point-of-user-interaction apparatus and the mobile device via the first authentication information and the second authentication information; and receiving a notification, from the computing device, of a valid transaction between the mobile device and the point-of-user-interaction apparatus after the computing device authenticates the transaction.

Example 32: The machine-readable storage media of example 31, wherein the point-of-user-interaction apparatus generates a first identification, wherein the first identification is used to match the first authentication information with the second authentication information.

Example 33: The machine-readable storage media of example 32 having further one or more machine-readable instructions stored therein, that when executed, cause the one or more machines to perform a further method for secure and fast transaction between the mobile device and the point-of-user-interaction apparatus, the further method comprising: generating a second identification which is a second unique identification, wherein the second identification is provided to the computing device via the point-of-user-interaction apparatus, wherein the second identification is used to identify the mobile device to the point-of-user-interaction apparatus.

Example 34: The machine-readable storage media of example 33, wherein the point-of-user-interaction apparatus is to generate a third identification which is a third unique identification, wherein the third identification is provided to the computing device via the mobile device.

Example 35: The machine-readable storage media of example 34, wherein the second unique identification is same as the third unique identification, or wherein the second unique identification is different than the third unique identification.

Example 1a: A point-of-user-interaction apparatus, comprising: a memory to store a communication message; a first controller with a security function, the first controller communicatively coupled to the memory, wherein the first controller is to generate a first authentication information and a second authentication information; a message circuitry to wirelessly transmit the communication message to a mobile device; one or more interfaces to: transmit the communication message to the message circuitry; transmit the first authentication information, via the message circuitry, to the mobile device, and transmit, via a network connection, the second authentication information to a computing device; a display unit to display an application to communicate with a user of the mobile device; and a second controller communicatively coupled to the display unit; wherein the first controller is to instruct at least one of the one or more interfaces to transmit the first authentication information to the mobile device; wherein the second controller is to instruct at least one of the one or more interfaces to transmit the second authentication information to the computing device, wherein the computing device is to authenticate a transaction between the point-of-user-interaction apparatus and the mobile device via the first authentication information and the second authentication information, and wherein the computing device is to notify the second controller of a valid transaction between mobile device and the point-of-user-interaction apparatus after the computing device authenticates the transaction.

Example 2a: The point-of-user-interaction apparatus of example 1a, comprises a circuitry operable to modify the communication message.

Example 3a: The point-of-user-interaction apparatus of example 1a, wherein the mobile device includes: an antenna to detect or read the communication message from the point-of-user-interaction apparatus near the mobile device; a reader to initiate a transmission of a command to the point-of-user-interaction apparatus, and to read a response from the point-of-user-interaction apparatus, wherein the reader is coupled to the antenna; a display unit to display an application based on the response from the point-of-user-interaction apparatus and/or the communication message; and a circuitry to receive the first authentication information from the point-of-user-interaction apparatus, wherein the circuitry is to send the first authentication information to the computing device.

Example 4a: The point-of-user-interaction apparatus of example 1a, wherein the first authentication information includes: a first key, wherein the first key is associated with a first cryptographic token; and a second cryptographic token, wherein the second cryptographic token is associated with a second key.

Example 5a: The point-of-user-interaction apparatus of example 4aa, wherein the second authentication information includes the second key and the first cryptographic token.

Example 6a: The point-of-user-interaction apparatus of example 3a, wherein the first controller generates a first identification, wherein the first identification is used to match the first authentication information with the second authentication information.

Example 7a: The point-of-user-interaction apparatus of example 6a, wherein the circuitry is to generate a second identification which is a second unique identification, wherein the second identification is provided to the computing device via the point-of-user-interaction apparatus, wherein the second identification is used to identify the mobile device to the point-of-user-interaction apparatus.

Example 8a: The point-of-user-interaction apparatus of example 7a, wherein the first controller is to generate a third identification which is a third unique identification, wherein the third identification is provided to the computing device via the mobile device.

Example 9a: The point-of-user-interaction apparatus example 8a, wherein the second unique identification is same as the third unique identification, or wherein the second unique identification is different than the third unique identification.

Example 10a: The point-of-user-interaction apparatus of example 3a, wherein the antenna continuously or regularly listens for communication messages near the mobile device.

Example 11a: The point-of-user-interaction apparatus of example 1a, wherein the communication message comprises a near field communication (NFC) data exchange format (NDEF) tag.

Example 12a: The point-of-user-interaction apparatus of example 3a, wherein the transmission and the response are near field communications.

Example 13a: The point-of-user-interaction apparatus of example 3a, wherein the reader comprises a first application programmable interface to initiate the transmission and to read the response.

Example 14a: The point-of-user-interaction apparatus of example 13a, wherein the mobile device comprises a second application programmable interface to issue a notification, or a hyperlink based on the response, wherein a user interaction with the notification or the hyperlink is to cause the display of the application.

Example 15a: The point-of-user-interaction apparatus of example 14a, wherein the notification or the hyperlink is part of the communication message.

Example 16a: The point-of-user-interaction apparatus of example 14a, wherein the mobile device comprises a camera or a biometric sensor to authenticate a user of the mobile device based on the notification or the hyperlink.

Example 17a: The point-of-user-interaction apparatus of example 1a, wherein the mobile device comprises a camera or a biometric sensor to authenticate a user of the mobile device.

Example 18a: The point-of-user-interaction apparatus of example 1a, wherein the valid transaction is a financial transaction or wherein the valid transaction is a voting ballot.

Example 19a: The point-of-user-interaction apparatus of example 5a, wherein: the mobile device is to send the first key and the second cryptographic token to the computing device; the computing device is to decode the second cryptographic token with the second key, the computing device is to decode the first cryptographic token with the first key, and computing device is to notify the second controller of a valid transaction between the mobile device and the point-of-user interaction apparatus after the first cryptographic token and the second cryptographic token are decoded.

Example 20a: The point-of-user-interaction apparatus of example 1a, wherein the message circuitry comprises an NFC radio.

Example 21a: A point-of-user-interaction apparatus, comprising: a memory to store a communication message; a processor circuitry with a security function, the processor circuitry communicatively coupled to the memory, wherein the processor circuitry is to generate a first authentication information and a second authentication information; a message circuitry to wirelessly transmit the communication message to a mobile device; one or more interfaces to: transmit the communication message to the message circuitry; transmit the first authentication information, via the message circuitry, to the mobile device, and transmit the second authentication information to a computing device; and a display unit to display an application to communicate with a user of the mobile device, wherein the display unit is communicatively coupled to the processor circuitry; wherein the processor circuitry is to instruct at least one of the one or more interfaces to transmit the first authentication information to the mobile device; wherein the processor circuitry is to instruct at least one of the one or more interfaces to transmit the second authentication information to the computing device, wherein the computing device is to authenticate a transaction between the point-of-user-interaction apparatus and the mobile device via the first authentication information and the second authentication information, and wherein the computing device is to notify the processor circuitry of a valid transaction between mobile device and the point-of-user-interaction apparatus after the computing device authenticates the transaction.

Example 22a: The point-of-user-interaction apparatus of example 21a, wherein the processor circuitry is part of a system-on-chip (SoC).

Example 23a: A method performed by a point-of-user-interaction apparatus, the method comprising: wirelessly transmitting a communication message to a mobile device, wherein the communication message is stored in a memory, wherein the memory is communicatively coupled to a processor circuitry; generating a first authentication information and a second authentication information; transmitting the first authentication information to the mobile device; transmitting the second authentication information to a computing device; displaying an application to communicate with a user of the mobile device, wherein the processor circuitry is to instruct at least one of a one or more interfaces to transmit the first authentication information to the mobile device, wherein the processor circuitry is to instruct at least one of the one or more interfaces to transmit the second authentication information to the computing device, wherein the computing device is to authenticate a transaction between the point-of-user-interaction apparatus and the mobile device via the first authentication information and the second authentication information; and receiving a notification of a valid transaction between mobile device and the point-of-user-interaction apparatus after the computing device authenticates the transaction.

Example 24a: The method of example 23a further comprising modifying the communication message.

Example 25a: The method of example 23a further comprising generating a first identification, wherein the first identification is used to match the first authentication information with the second authentication information.

Example 26a: The method of example 25a, wherein the mobile device is to generate a second identification which is a second unique identification, wherein the second identification is provided to the computing device via the point-of-user-interaction apparatus, wherein the second identification is used to identify the mobile device to the point-of-user-interaction apparatus.

Example 27a: The method of example 26a, further comprising generating a third identification which is a third unique identification, wherein the third identification is provided to the computing device via the mobile device.

Example 28a: The method of example 27a, wherein the second unique identification is same as the third unique identification, or wherein the second unique identification is different than the third unique identification.

Example 29a: A machine-readable storage media having one or more machine-readable instructions stored therein, that when executed, cause one or more machines to perform a method for secure and fast transaction between a mobile device and a point-of-user-interaction apparatus, the method comprising: wirelessly transmitting a communication message to a mobile device, wherein the communication message is stored in a memory, wherein the memory is communicatively coupled to a processor circuitry; generating a first authentication information and a second authentication information; transmitting the first authentication information to the mobile device, transmitting the second authentication information to a computing device; displaying an application to communicate with a user of the mobile device, wherein the processor circuitry is to instruct at least one of a one or more interfaces to transmit the first authentication information to the mobile device, wherein the processor circuitry is to instruct at least one of the one or more interfaces to transmit the second authentication information to the computing device, wherein the computing device is to authenticate a transaction between the point-of-user-interaction apparatus and the mobile device via the first authentication information and the second authentication information; and receiving a notification of a valid transaction between mobile device and the point-of-user-interaction apparatus after the computing device authenticates the transaction.

Example 30a: The machine-readable storage media of example 29a having further one or more machine-readable instructions stored therein, that when executed, cause the one or more machines to perform a further method comprising: modifying the communication message.

Example 31a: The machine-readable storage media of example 29a having further one or more machine-readable instructions stored therein, that when executed, cause the one or more machines to perform a further method comprising: generating a first identification, wherein the first identification is used to match the first authentication information with the second authentication information.

Example 32a: The machine-readable storage media of example 31a, wherein the mobile device is to generate a second identification which is a second unique identification, wherein the second identification is provided to the computing device via the point-of-user-interaction apparatus, wherein the second identification is used to identify the mobile device to the point-of-user-interaction apparatus.

Example 33a: The machine-readable storage media of example 32a, having further one or more machine-readable instructions stored therein, that when executed, cause the one or more machines to perform a further method comprising: generating a third identification which is a third unique identification, wherein the third identification is provided to the computing device via the mobile device.

Example 34a: The machine-readable storage media of example 33a, wherein the second unique identification is same as the third unique identification, or wherein the second unique identification is different than the third unique identification.

Example 1b: An apparatus comprising: a processor; a first communication interface to allow the processor to communicate with a mobile device, wherein the first communication interface is to receive a first authentication information from the mobile device; and a second communication interface to allow the processor to communicate with point-of-user-interaction apparatus, wherein the second communication interface is to receive a second authentication information from the point-of-user-interaction apparatus, wherein the processor is to authenticate a transaction between the mobile device and the point-of-user-interaction apparatus by application of the first authentication information and the second authentication information, wherein the processor is to notify the mobile device of a validity of the transaction via the first communication interface, wherein the processor is to notify the point-of-user-interaction apparatus of the validity of the transaction via the second communication interface.

Example 2b: The apparatus of example 1b, wherein the first communication interface comprises a wireless interface.

Example 3b: The apparatus of example 1b, wherein the second communication interface comprises a network interface.

Example 4b: The apparatus of example 1b, wherein the point-of-user-interaction apparatus comprises: a memory to store a communication message; a first controller with a security function, the first controller communicatively coupled to the memory, wherein the first controller is to generate the first authentication information and the second authentication information;

a message circuitry to wirelessly transmit the communication message to the mobile device; one or more interfaces to: transmit the communication message to the message circuitry; transmit the first authentication information, via the message circuitry, to the mobile device, and transmit, via a network connection, the second authentication information to the second communication interface; a display unit to display an application to communicate with a user of the mobile device; and a second controller communicatively coupled to the display unit; wherein the first controller is to instruct at least one of the one or more interfaces to transmit the first authentication information to the mobile device, and wherein the second controller is to instruct at least one of the one or more interfaces to transmit the second authentication information to the second communication interface.

Example 5b: The apparatus of example 4b, wherein the point-of-user-interaction apparatus comprises a circuitry operable to modify the communication message.

Example 6b: The apparatus of example 4b, wherein the mobile device includes: an antenna to detect or read the communication message from the point-of-user-interaction apparatus near the mobile device; a reader to initiate a transmission of a command to the point-of-user-interaction apparatus, and to read a response from the point-of-user-interaction apparatus, wherein the reader is coupled to the antenna; a display unit to display an application based on the response from the point-of-user-interaction apparatus and/or the communication message; and a circuitry to receive the first authentication information from the point-of-user-interaction apparatus, wherein the circuitry is to send the first authentication information to the first communication interface.

Example 7b: The apparatus of example 4b, wherein the first authentication information includes: a first key, wherein the first key is associated with a first cryptographic token; and a second cryptographic token, wherein the second cryptographic token is associated with a second key.

Example 8b: The apparatus of example 7b, wherein the second authentication information includes the second key and the first cryptographic token.

Example 9b: The apparatus of example 4b, wherein the first controller generates a first identification, wherein the first identification is used to match the first authentication information with the second authentication information.

Example 10b: The apparatus of example 9b, wherein the circuitry is to generate a second identification which is a second unique identification, wherein the apparatus is to receive the second identification via the point-of-user-interaction apparatus, wherein the second identification is used to identify the mobile device to the point-of-user-interaction apparatus.

Example 11b: The apparatus of example 10b, wherein the point-of-user-interaction apparatus is to generate a third identification which is a third unique identification, wherein the third identification is provided to the apparatus via the mobile device.

Example 12b: The apparatus of example 11b, wherein the second unique identification is same as the third unique identification, or wherein the second unique identification is different than the third unique identification.

Example 13b: The apparatus of example 6b, wherein the antenna continuously or regularly listens for communication messages near the mobile device.

Example 14b: The apparatus of example 6b, wherein the communication message comprises a near field communication (NFC) data exchange format (NDEF) tag.

Example 15b: The apparatus of example 6b, wherein the transmission and the response are near field communications.

Example 16b: The apparatus of example 6b, wherein the reader comprises a first application programmable interface to initiate the transmission and to read the response.

Example 17b: The apparatus of example 16b, wherein the mobile device comprises a second application programmable interface to issue a notification or a hyperlink based on the response, wherein a user interaction with the notification or the hyperlink is to cause the display of the application.

Example 18b: The apparatus of example 17b, wherein the notification or the hyperlink is part of the communication message.

Example 19b: The apparatus of example 17b, wherein the mobile device comprises a camera or a biometric sensor to authenticate a user of the mobile device based on the notification or the hyperlink.

Example 20b: The apparatus of example 1b, wherein the mobile device comprises a camera or a biometric sensor to authenticate a user of the mobile device.

Example 21b: The apparatus of example 1b, wherein the transaction is a financial transaction or wherein the transaction is a voting ballot.

Example 22b: The apparatus of example 8b, wherein: the mobile device is to send the first key and the second cryptographic token to the first communication interface; the processor is to decode the second cryptographic token with the second key, the processor is to decode the first cryptographic token with the first key, and the processor is to notify the second controller of a valid transaction between the mobile device and the point-of-user interaction apparatus after the first cryptographic token and the second cryptographic token are decoded.

Example 23b: The apparatus of example 4b, wherein the message circuitry comprises an NFC radio.

Example 24b: A method for authenticating a transaction between a mobile device and a point-of-user-interaction apparatus, the method comprising: receiving a first authentication information from the mobile device; receiving a second authentication information from the point-of-user-interaction apparatus; authenticating a transaction between the mobile device and the point-of-user-interaction apparatus by application of the first authentication information and the second authentication information; notifying the mobile device of a validity of the transaction; and notifying the point-of-user-interaction apparatus of the validity of the transaction.

Example 25b: The method of example 24b, wherein the point-of-user-interaction apparatus comprises: a memory to store a communication message; a first controller with a security function, the first controller communicatively coupled to the memory, wherein the first controller is to generate the first authentication information and the second authentication information; a message circuitry to wirelessly transmit the communication message to the mobile device; one or more interfaces to: transmit the communication message to the message circuitry; transmit the first authentication information, via the message circuitry, to the mobile device, and transmit, via a network connection, the second authentication information to the second communication interface; a display unit to display an application to communicate with a user of the mobile device; and a second controller communicatively coupled to the display unit; wherein the first controller is to instruct at least one of the one or more interfaces to transmit the first authentication information to the mobile device, and wherein the second controller is to instruct at least one of the one or more interfaces to transmit the second authentication information to the second communication interface.

Example 26b: The method of example 25b, wherein the point-of-user-interaction apparatus comprises a circuitry operable to modify the communication message.

Example 27b: The method of example 25b, wherein the mobile device includes: an antenna to detect or read the communication message from the point-of-user-interaction apparatus near the mobile device; a reader to initiate a transmission of a command to the point-of-user-interaction apparatus, and to read a response from the point-of-user-interaction apparatus, wherein the reader is coupled to the antenna; a display unit to display an application based on the response from the point-of-user-interaction apparatus and/or the communication message; and a circuitry to receive the first authentication information from the point-of-user-interaction apparatus, wherein the circuitry is to send the first authentication information to the first communication interface.

Example 28b: The method of example 25b, wherein the first authentication information includes: a first key, wherein the first key is associated with a first cryptographic token; and a second cryptographic token, wherein the second cryptographic token is associated with a second key.

Example 29b: The method of example 28b, wherein the second authentication information includes the second key and the first cryptographic token.

Example 30b: The method of example 25b, wherein the first controller generates a first identification, wherein the first identification is used to match the first authentication information with the second authentication information, wherein the method comprising: receiving the first identification.

Example 31b: The method of example 30b, wherein the mobile device is to generate a second identification which is a second unique identification, wherein the method comprises: receiving the second identification via the point-of-user-interaction apparatus, wherein the second identification is used to identify the mobile device to the point-of-user-interaction apparatus.

Example 32b: The method of example 31b, wherein the point-of-user-interaction apparatus is to generate a third identification which is a third unique identification, wherein the method comprises: receiving the third identification via the mobile device.

Example 33b: The method of example 32b, wherein the second unique identification is same as the third unique identification, or wherein the second unique identification is different than the third unique identification.

Example 34b: A machine-readable media having machine-executable instructions stored thereon, that when executed, cause one or more processors to perform a method for authenticating a transaction between a mobile device and a point-of-user-interaction apparatus, the method comprising: receiving a first authentication information from the mobile device; receiving a second authentication information from the point-of-user-interaction apparatus; authenticating a transaction between the mobile device and the point-of-user-interaction apparatus by application of the first authentication information and the second authentication information; notifying the mobile device of a validity of the transaction; and notifying the point-of-user-interaction apparatus of the validity of the transaction.

Example 35b: The machine-readable media of example 34b, the method comprising: receiving a first identification, wherein the first identification is generated by the point-of-user-interaction apparatus, wherein the first identification is used to match the first authentication information with the second authentication information.

Example 36b: The machine-readable media of example 35b, the method comprising: receiving a second identification via the point-of-user-interaction apparatus, wherein the second identification is generated by the mobile device, wherein the second identification is a second unique identification which is used to identify the mobile device to the point-of-user-interaction apparatus.

Example 37b: The machine-readable media of example 36b, wherein the point-of-user-interaction apparatus is to generate a third identification which is a third unique identification, wherein the method comprises: receiving the third identification via the mobile device.

Example 38b: The machine-readable media of example 37b, wherein the second unique identification is same as the third unique identification, or wherein the second unique identification is different than the third unique identification.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A point-of-user-interaction apparatus, comprising:
a memory to store a communication message;
a first controller with a security function, the first controller communicatively coupled to the memory, wherein the first controller is to generate a first authentication information, a first identification, and a second authentication information, wherein the first authentication information includes a first key and a second cryptographic token, wherein the first key is associated with a first cryptographic token, and wherein the second cryptographic token is associated with a second key;
a message circuitry to wirelessly transmit the communication message to a mobile device, wherein the communication message includes a hyperlink;
one or more interfaces to:
    transmit the communication message to the message circuitry;
    transmit the first authentication information via the message circuitry, to the mobile device;
    transmit, via a network connection, the second authentication information to a computing device;

transmit, via the message circuitry, the first identification to the mobile device and the computing device;
    receive, via the message circuitry, a second identification which is a second unique identification generated by the message circuitry; and
    transmit, via the message circuitry, a third identification to the mobile device, wherein the third identification is a third unique identification generated by the first controller;
a display unit configured to display an application to communicate with a user of the mobile device; and
a second controller communicatively coupled to the display unit,
wherein the first controller is to instruct at least one of the one or more interfaces to transmit the first authentication information to the mobile device,
wherein the second controller is to instruct at least one of the one or more interfaces to transmit the second authentication information to the computing device,
wherein the computing device is to authenticate a transaction between the point-of-user-interaction apparatus and the mobile device by using the first identification to match the first authentication information and the second authentication information,
wherein the first identification is dynamically generated for each transaction,
wherein the second identification is provided to the computing device via the point-of-user-interaction apparatus,
wherein the second identification is used to identify the mobile device to the point-of-user-interaction apparatus,
wherein the third identification is provided to the computing device via the mobile device,
wherein the third identification is used to identify the point-of-user-interaction apparatus to the mobile device,
wherein the second identification and the third identification are transmitted via different sources and paths to the computing device providing protection against single-point-of-failure attacks, and
wherein the computing device is to notify the first controller of a valid transaction between the mobile device and the point-of-user-interaction apparatus after the computing device authenticates the transaction.

2. The point-of-user-interaction apparatus of claim 1, comprises a circuitry operable to modify the communication message.

3. The point-of-user-interaction apparatus of claim 1, wherein the mobile device includes:
    an antenna to detect or read the communication message from the point-of-user-interaction apparatus near the mobile device;
    a reader to initiate a transmission of a command to the point-of-user-interaction apparatus, and to read a response from the point-of-user-interaction apparatus, wherein the reader is coupled to the antenna;
    a display unit configured to display an application based on the response from the point-of-user-interaction apparatus and/or the communication message; and
    a circuitry to receive the first authentication information from the point-of-user-interaction apparatus, wherein the circuitry is to send the first authentication information to the computing device.

4. The point-of-user-interaction apparatus of claim 1, wherein the second authentication information includes the second key and the first cryptographic token.

5. The point-of-user-interaction apparatus of claim 1, wherein the second unique identification and same as the third unique identification, or wherein the second unique identification and different than the third unique identification.

6. The point-of-user-interaction apparatus of claim 3, wherein an antenna continuously or regularly listens for communication messages near the mobile device.

7. The point-of-user-interaction apparatus of claim 1, wherein the communication message comprises a near field communication (NFC) data exchange format (NDEF) tag.

8. The point-of-user-interaction apparatus of claim 3, wherein the transmission and the response are near field communications.

9. The point-of-user-interaction apparatus of claim 3, wherein the reader comprises a first application programmable interface to initiate the transmission and to read the response.

10. The point-of-user-interaction apparatus of claim 9, wherein the mobile device comprises a second application programmable interface to issue a notification or the hyperlink based on the response, and wherein a user interaction with the notification or the hyperlink is to cause displaying of the application.

11. The point-of-user-interaction apparatus of claim 10, wherein the mobile device comprises a camera or a biometric sensor to authenticate a user of the mobile device based on the notification or the hyperlink.

12. The point-of-user-interaction apparatus of claim 1, wherein the mobile device comprises a camera or a biometric sensor to authenticate a user of the mobile device.

13. The point-of-user-interaction apparatus of claim 1, wherein the valid transaction is a financial transaction or wherein the valid transaction is a voting ballot.

14. The point-of-user-interaction apparatus of claim 4, wherein:

the mobile device is to send the first key and the second cryptographic token to the computing device;

the computing device is to decode the second cryptographic token with the second key;

the computing device is to decode the first cryptographic token with the first key; and the computing device is to notify the second controller of a valid transaction between the mobile device and the point-of-user-interaction apparatus after the first cryptographic token and the second cryptographic token are decoded.

15. The point-of-user-interaction apparatus of claim 1, wherein the message circuitry comprises an NFC radio.

16. A point-of-user-interaction apparatus, comprising:

a memory to store a communication message;

a processor circuitry with a security function, the processor circuitry communicatively coupled to the memory, wherein the processor circuitry is to generate a first authentication information, a first identification, and a second authentication information, wherein the first authentication information includes a first key and a second cryptographic token, wherein the first key is associated with a first cryptographic token, and wherein the second cryptographic token is associated with a second key;

a message circuitry to wirelessly transmit the communication message to a mobile device, wherein the communication message includes a hyperlink;

one or more interfaces to:

transmit the communication message to the message circuitry;

transmit the first authentication information, via the message circuitry, to the mobile device;

transmit the second authentication information to a computing device;

transmit, via the message circuitry and a network connection, the first identification to the mobile device and the computing device;

receive, via the message circuitry, a second identification which is a second unique identification generated by the message circuitry; and transmit, via the message circuitry, a third identification to the mobile device, wherein the third identification is a third unique identification generated by a first controller; and a display unit configured to display an application to communicate with a user of the mobile device, wherein the display unit is communicatively coupled to the processor circuitry, wherein the processor circuitry is to instruct at least one of the one or more interfaces to transmit the first authentication information to the mobile device, wherein the processor circuitry is to instruct at least one of the one or more interfaces to transmit the second authentication information to the computing device, wherein the computing device is to authenticate a transaction between the point-of-user-interaction apparatus and the mobile device by using the first identification to match the first authentication information and the second authentication information, wherein the first identification is dynamically generated for each transaction, wherein the second identification is provided to the computing device via the point-of-user-interaction apparatus, wherein the second identification is used to identify the mobile device to the point-of-user-interaction apparatus, wherein the third identification is provided to the computing device via the mobile device, wherein the third identification is used to identify the point-of-user-interaction apparatus to the mobile device, wherein the point-of-user-interaction apparatus enables two-way information exchange with dynamic information generation by each party for mutual verification of location and identity, and wherein the computing device is to notify the processor circuitry of a valid transaction between the mobile device and the point-of-user-interaction apparatus after the computing device authenticates the transaction.

17. The point-of-user-interaction apparatus of claim 16, wherein the processor circuitry is part of a system-on-chip (SoC).

18. A method performed by a point-of-user-interaction apparatus, the method comprising:

wirelessly transmitting a communication message to a mobile device, wherein the communication message is stored in a memory, and wherein the memory is communicatively coupled to a processor circuitry;

generating a first authentication information, a first identification, and a second authentication information, wherein the first authentication information includes a first key and a second cryptographic token, wherein the first key is associated with a first cryptographic token, wherein the second cryptographic token is associated with a second key, and wherein the first authentication information is generated by a secure element including the second cryptographic token and the first key with an unencrypted randomly generated matcher identification;

transmitting the first authentication information to the mobile device;

transmitting the second authentication information to a computing device;

transmitting the first identification to the mobile device and the computing device;

receiving a second identification which is a second unique identification; and transmitting a third identification to the mobile device, wherein the third identification is a third unique identification;

displaying an application to communicate with a user of the mobile device, wherein the processor circuitry is to instruct at least one of a one or more interfaces to transmit the first authentication information to the mobile device, wherein the processor circuitry is to instruct at least one of the one or more interfaces to transmit the second authentication information to the computing device, wherein the computing device is to authenticate a transaction between the point-of-user-interaction apparatus and the mobile device by using the first identification to match the first authentication information and the second authentication information, and wherein the first identification is dynamically generated for each transaction;

providing the second identification to the computing device, wherein the second identification is used to identify the mobile device to the point-of-user-interaction apparatus, wherein the third identification is provided to the computing device via the mobile device, and wherein the third identification is used to identify the point-of-user-interaction apparatus to the mobile device; and receiving a notification of a valid transaction between the mobile device and the point-of-user-interaction apparatus after the computing device authenticates the transaction.

19. The method of claim 18, further comprising modifying the communication message.

20. The method of claim 18, wherein the second unique identification and same as the third unique identification, or wherein the second unique identification and different than the third unique identification.

21. A non-transitory machine-readable storage media having one or more machine-readable instructions stored therein, that when executed, cause one or more machines to perform a method for secure and fast transaction between a mobile device and a point-of-user-interaction apparatus, the method comprising:

wirelessly transmitting a communication message to a mobile device, wherein the communication message is stored in a memory, and wherein the memory is communicatively coupled to a processor circuitry;

generating a first authentication information and a second authentication information, wherein the first authentication information includes a first key and a second cryptographic token, wherein the first key is associated with a first cryptographic token and wherein the second cryptographic token is associated with a second key;

transmitting the first authentication information to the mobile device, transmitting the second authentication information to a computing device;

transmitting a first identification to the mobile device and the computing device;

receiving a second identification which is a second unique identification; and transmitting a third identification to the mobile device, wherein the third identification is a third unique identification;

displaying an application to communicate with a user of the mobile device, wherein the processor circuitry is to instruct at least one of a one or more interfaces to transmit the first authentication information to the mobile device, wherein the processor circuitry is to instruct at least one of the one or more interfaces to transmit the second authentication information to the computing device, wherein the computing device is to authenticate a transaction between the point-of-user-interaction apparatus and the mobile device by using the first identification to match the first authentication information and the second authentication information, and wherein the first identification is dynamically generated for each transaction, and wherein the first identification is generated dynamically for each individual transaction instance ensuring unique transaction identification;

providing the second identification to the computing device, wherein the second identification is used to identify the mobile device to the point-of-user-interaction apparatus, wherein the third identification is provided to the computing device via the mobile device, wherein the third identification is used to identify the point-of-user-interaction apparatus to the mobile device, and wherein the second identification and the third identification are transmitted via different sources and paths to the computing device providing protection against single-point-of-failure attacks; and receiving a notification of a valid transaction between mobile device and the point-of-user-interaction apparatus after the computing device authenticates the transaction.

22. The non-transitory machine-readable storage media of claim 21 having further one or more machine-readable instructions stored therein, that when executed, cause the one or more machines to perform a further method comprising:

modifying the communication message.

23. The non-transitory machine-readable storage media of claim 21, wherein the second unique identification and same as the third unique identification, or wherein the second unique identification and different than the third unique identification.

* * * * *